(12) United States Patent
Oono

(10) Patent No.: US 7,957,228 B2
(45) Date of Patent: *Jun. 7, 2011

(54) INFORMATION RECORDING DEVICE AND METHOD, AND COMPUTER PROGRAM

(75) Inventor: Kenichi Oono, Saitama (JP)

(73) Assignee: Pioneer Corporation, Tokyo (JP)

( * ) Notice: Subject to any disclaimer, the term of this patent is extended or adjusted under 35 U.S.C. 154(b) by 340 days.

This patent is subject to a terminal disclaimer.

(21) Appl. No.: 12/091,945

(22) PCT Filed: Oct. 31, 2006

(86) PCT No.: PCT/JP2006/321719
§ 371 (c)(1),
(2), (4) Date: Jul. 10, 2008

(87) PCT Pub. No.: WO2007/052640
PCT Pub. Date: May 10, 2007

(65) Prior Publication Data
US 2009/0238046 A1 Sep. 24, 2009

(30) Foreign Application Priority Data
Oct. 31, 2005 (JP) .................................. 2005-315868

(51) Int. Cl.
*G11B 21/08* (2006.01)
(52) U.S. Cl. .................................. 369/30.12; 369/44.32

(58) Field of Classification Search ............... 369/30.12, 369/44.32, 30.1, 30.11, 30.13–30.17, 44.28, 369/44.27, 44.29, 44.35, 53.2, 53.41
See application file for complete search history.

(56) References Cited

U.S. PATENT DOCUMENTS

| 7,596,062 | B2 * | 9/2009 | Dan et al. | 369/44.32 |
| 2009/0097367 | A1 * | 4/2009 | Sasaki et al. | 369/44.32 |
| 2009/0161505 | A1 * | 6/2009 | Oono et al. | 369/44.32 |
| 2010/0202265 | A1 * | 8/2010 | Yoshimoto | 369/53.13 |

FOREIGN PATENT DOCUMENTS

| JP | 6-68502 | 3/1994 |
| JP | 8-147721 | 6/1996 |
| JP | 11-39678 | 2/1999 |
| JP | 2001-23185 | 1/2001 |

* cited by examiner

*Primary Examiner* — Tan X Dinh
(74) *Attorney, Agent, or Firm* — Young & Thompson

(57) ABSTRACT

An information recording apparatus (1) is provided with: a first judging device (191) for judging whether or not a tracking error signal is greater than or equal to a first threshold value; a detecting device (192) for detecting, as a detection angle, a rotation angle of an information recording medium (100) when it is judged that the tracking error signal is greater than or equal to the first threshold value; and a second judging device (193) for judging whether or not the judgment that the tracking error signal is greater than or equal to the first threshold value is performed in synchronization with rotation of the information recording medium and at the same detection angle in a row.

13 Claims, 11 Drawing Sheets

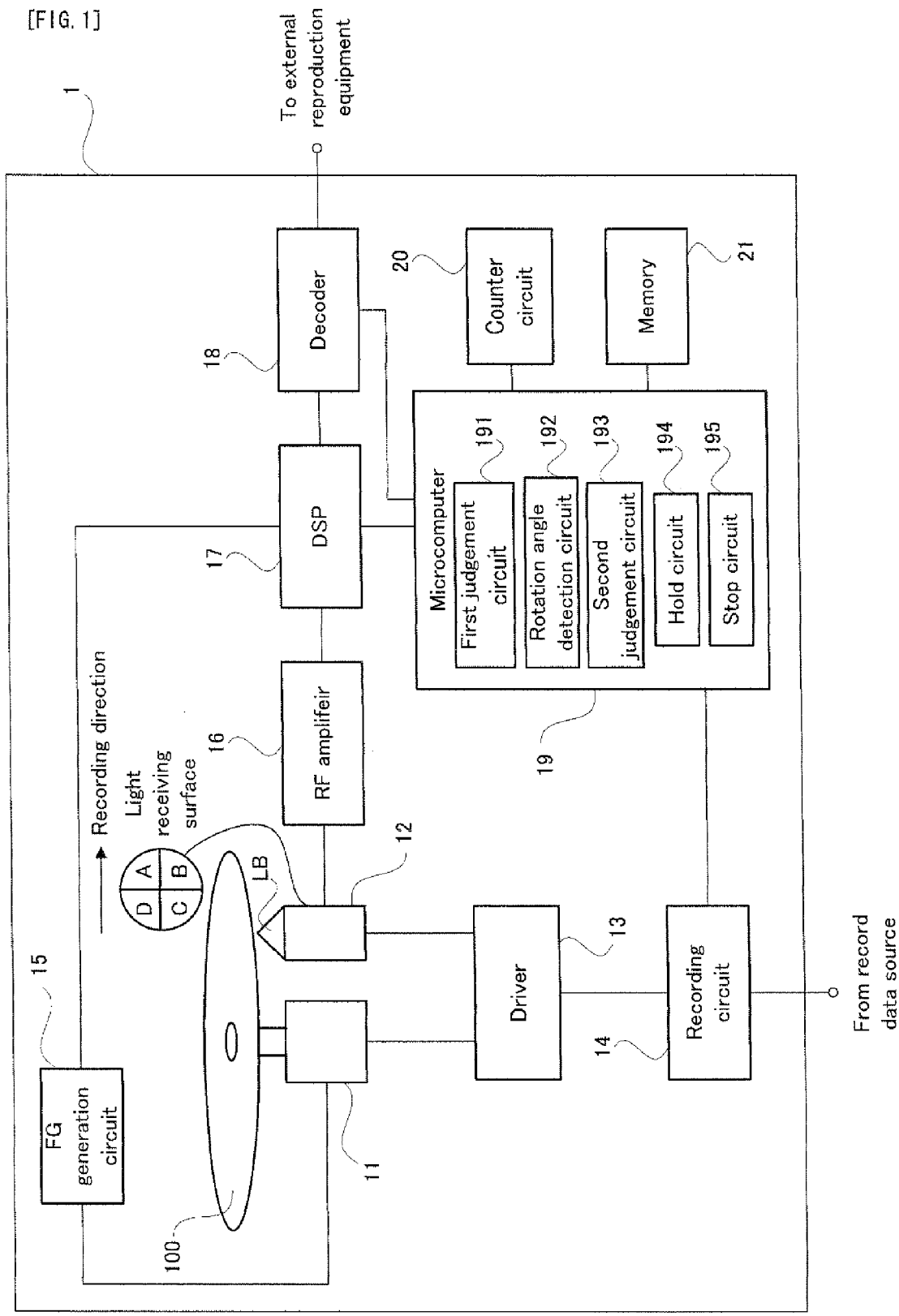

[FIG. 2]
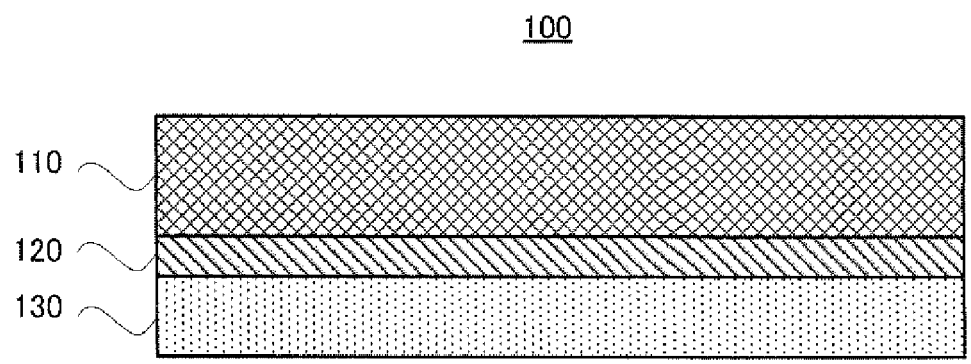
(a)
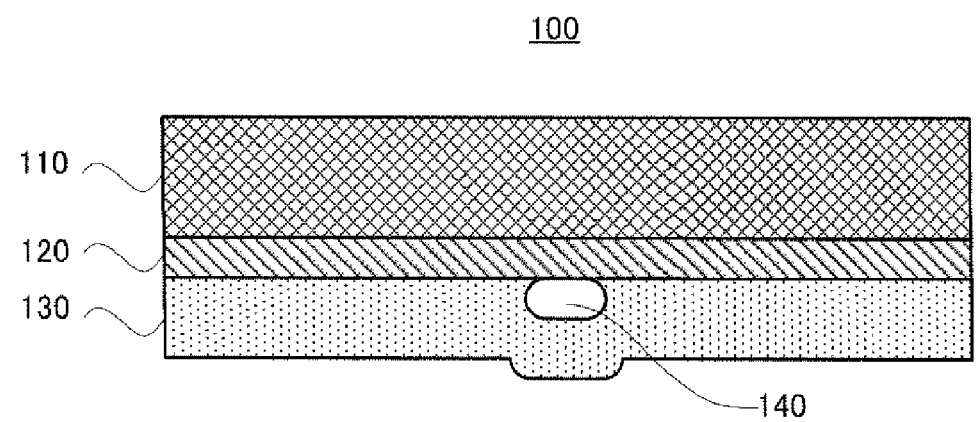
(b)

[FIG. 3]
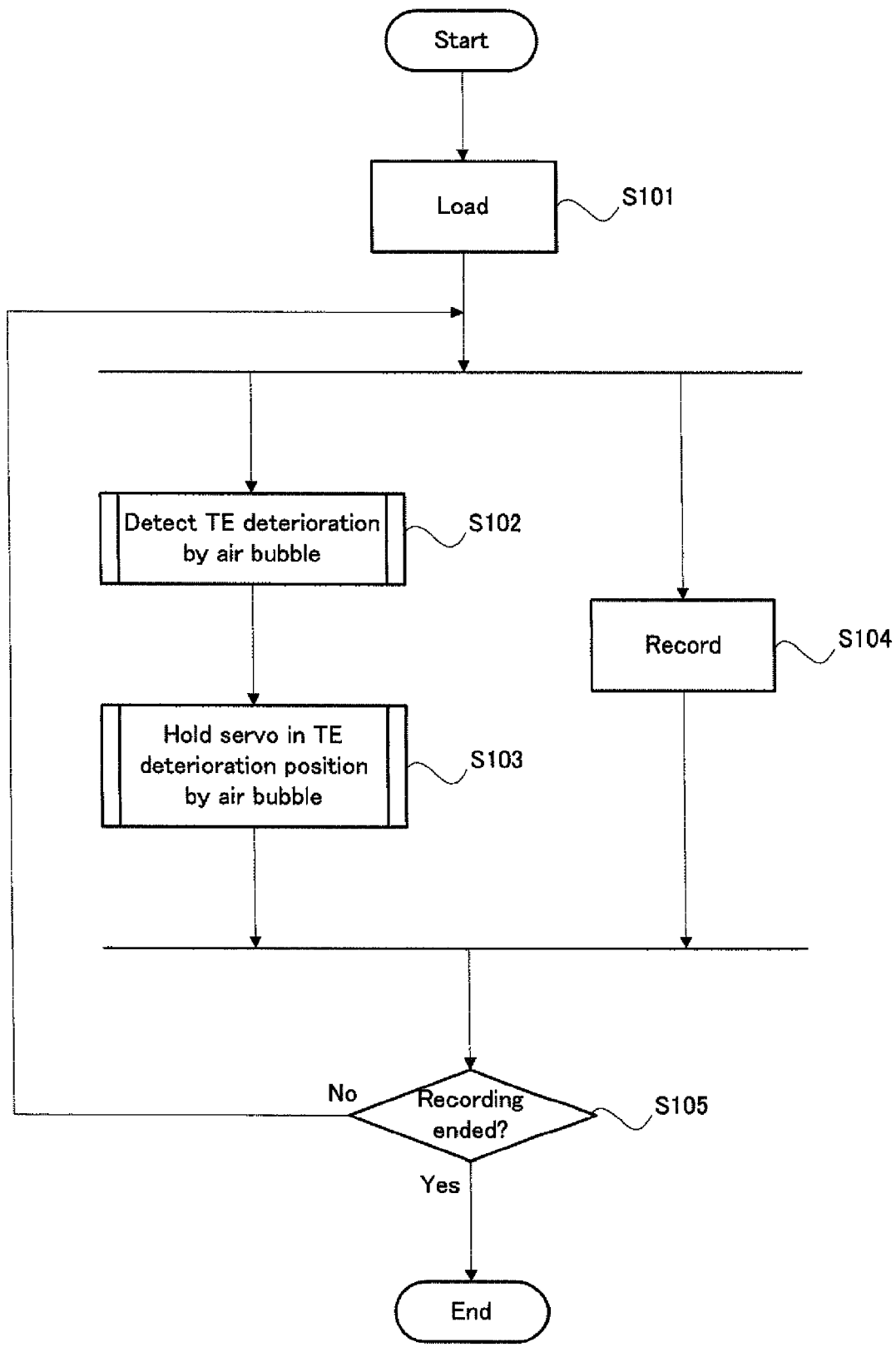

[FIG. 4]
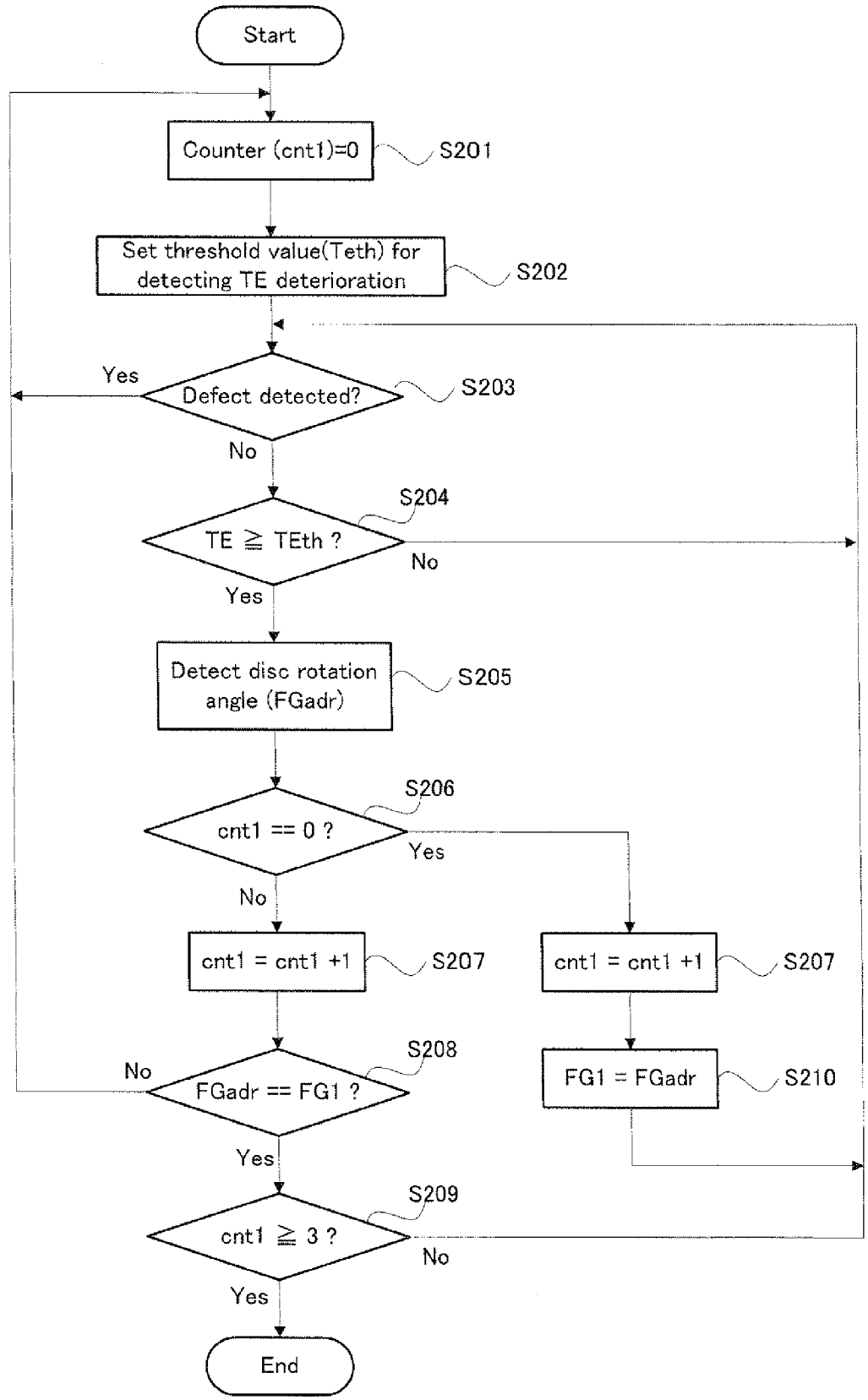

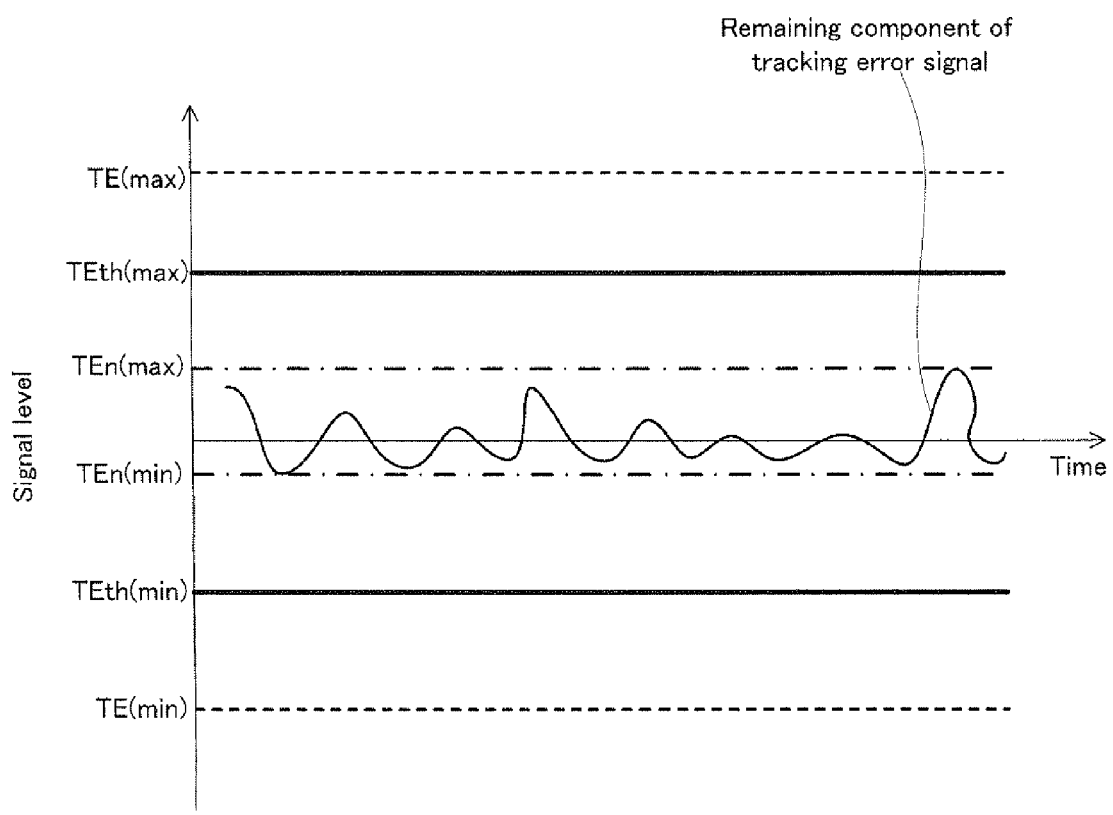
[FIG. 5]

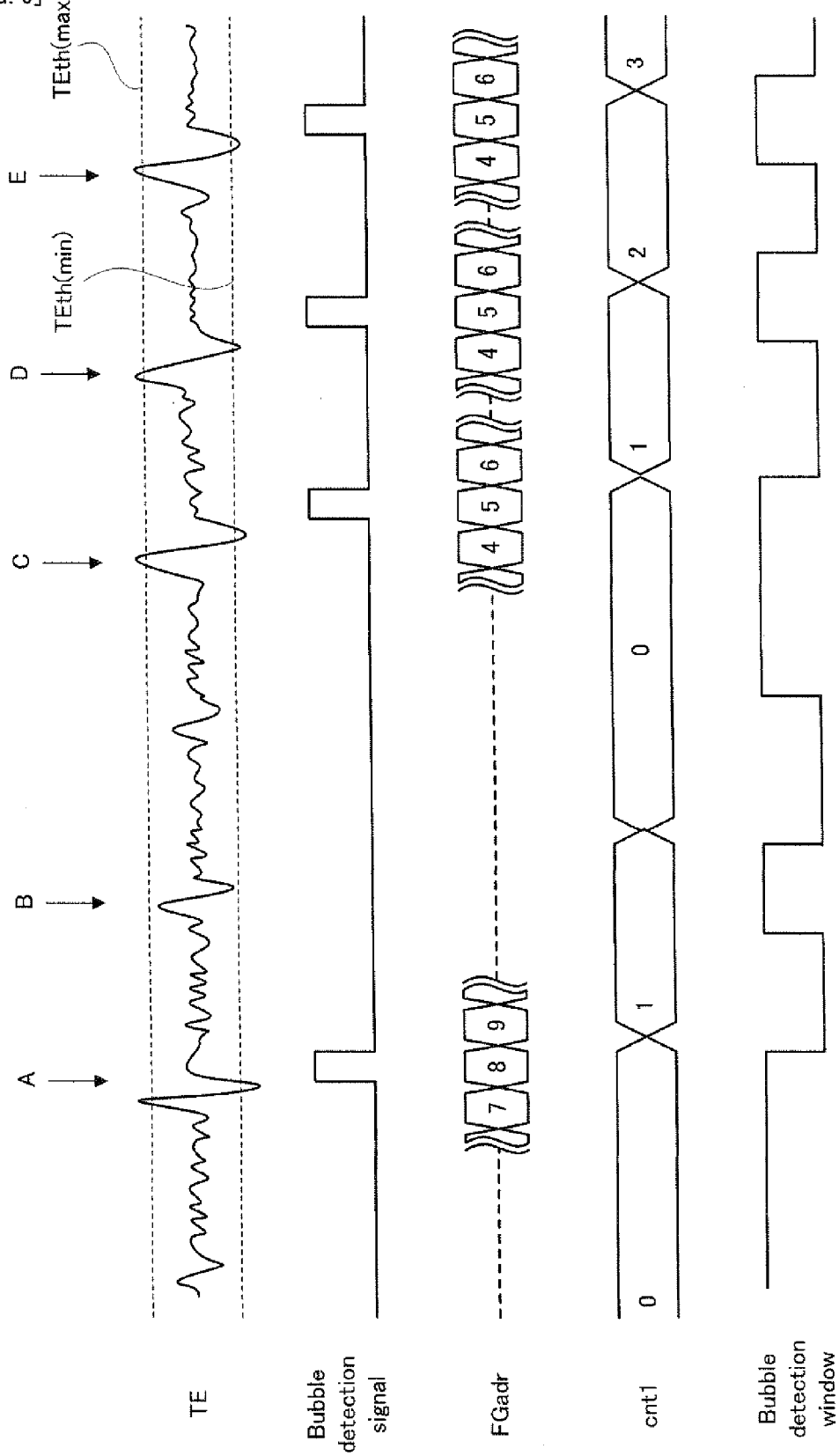

[FIG. 7]
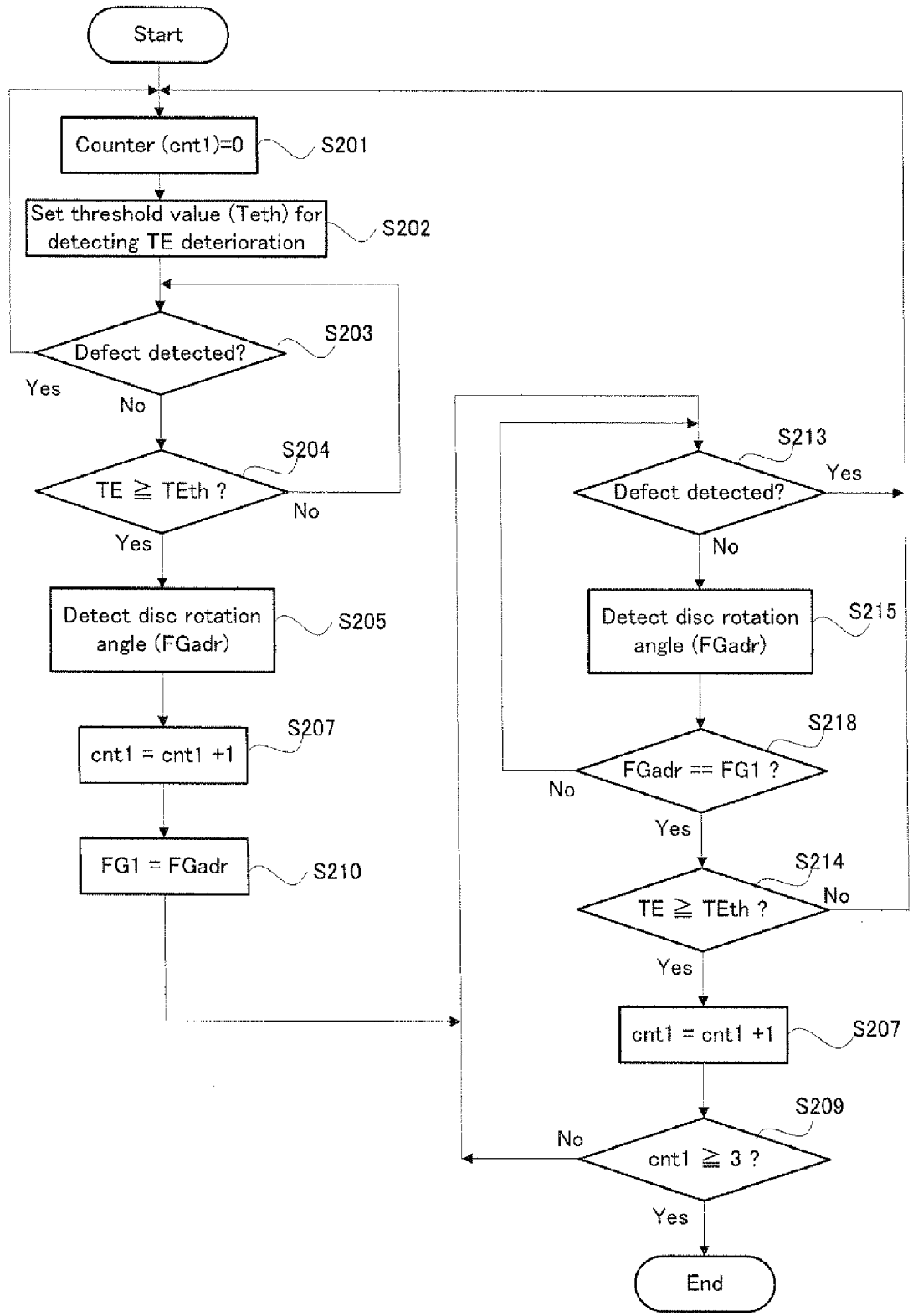

[FIG. 8]
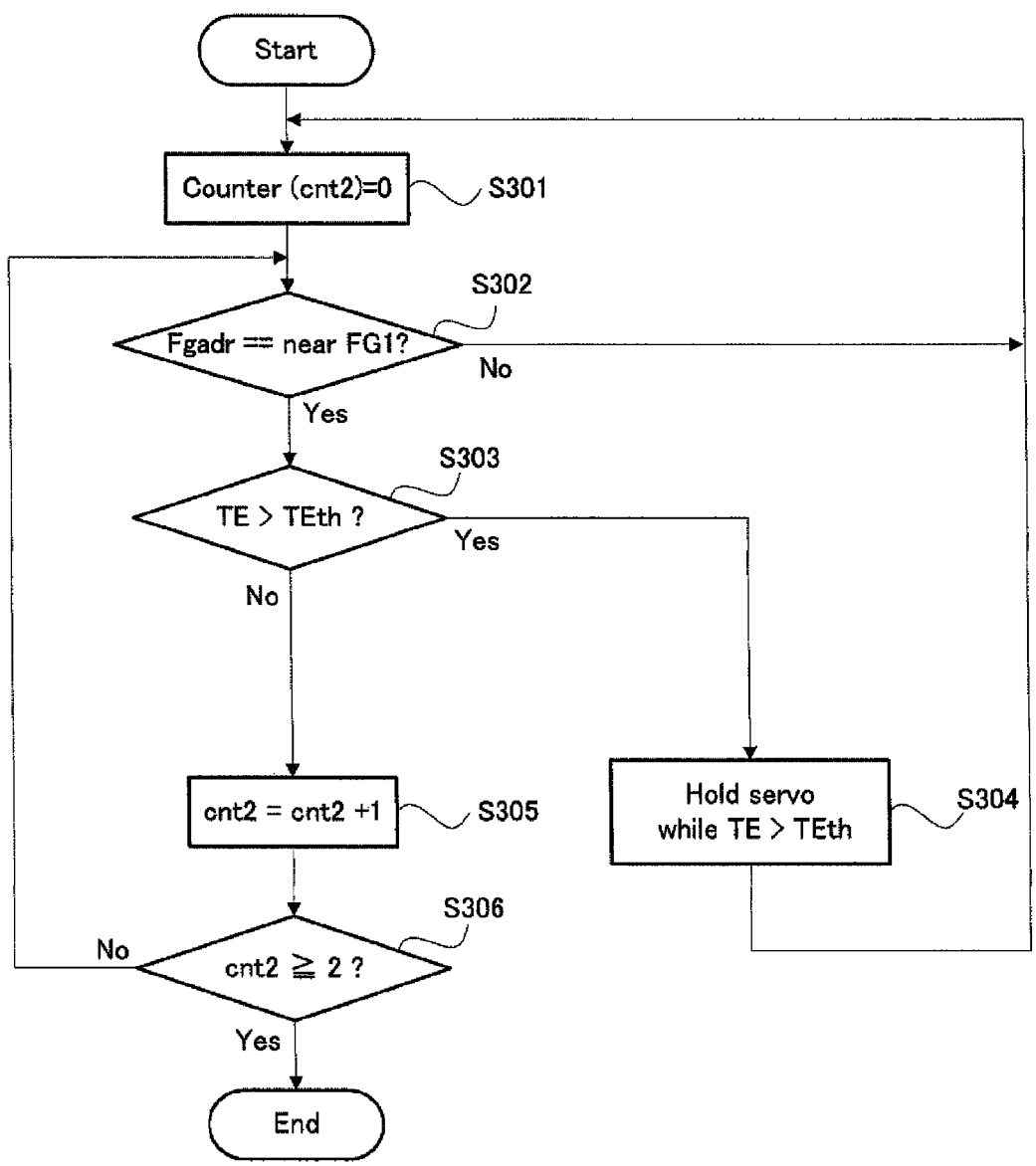

[FIG. 9]
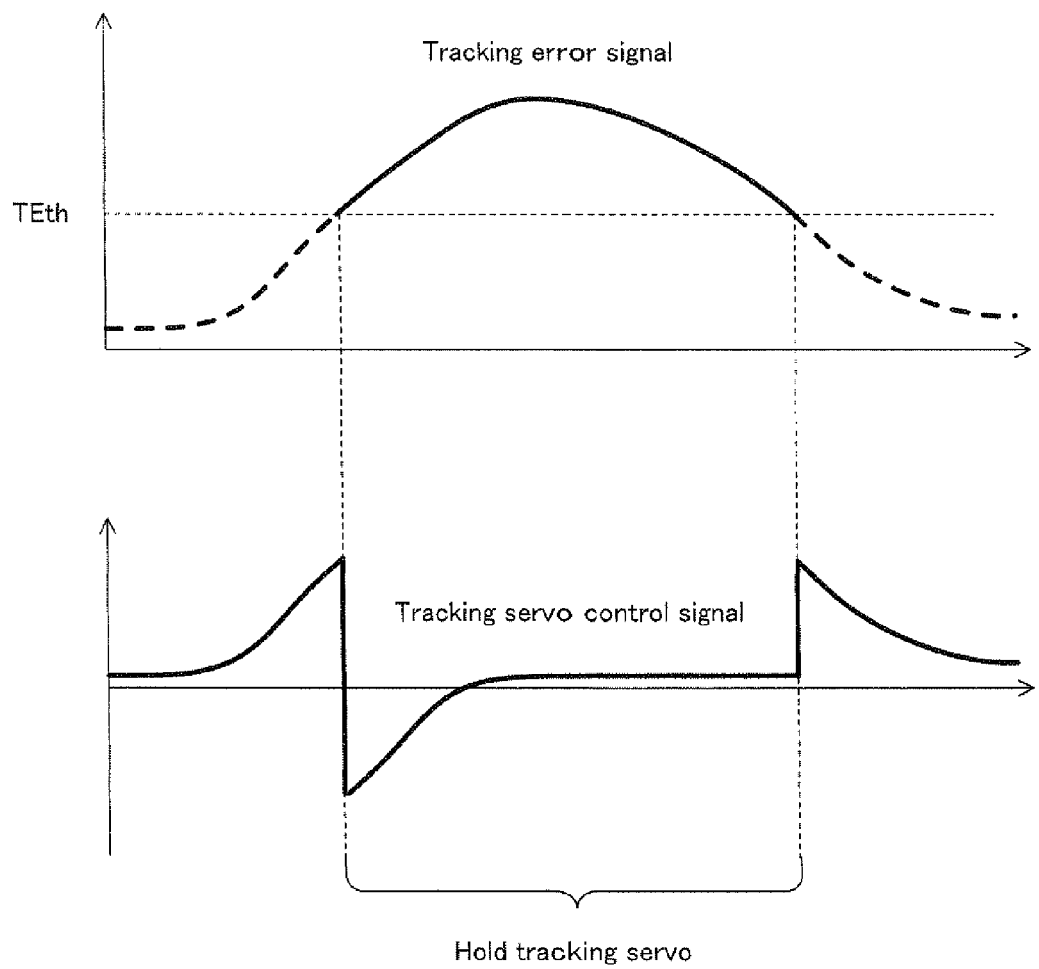

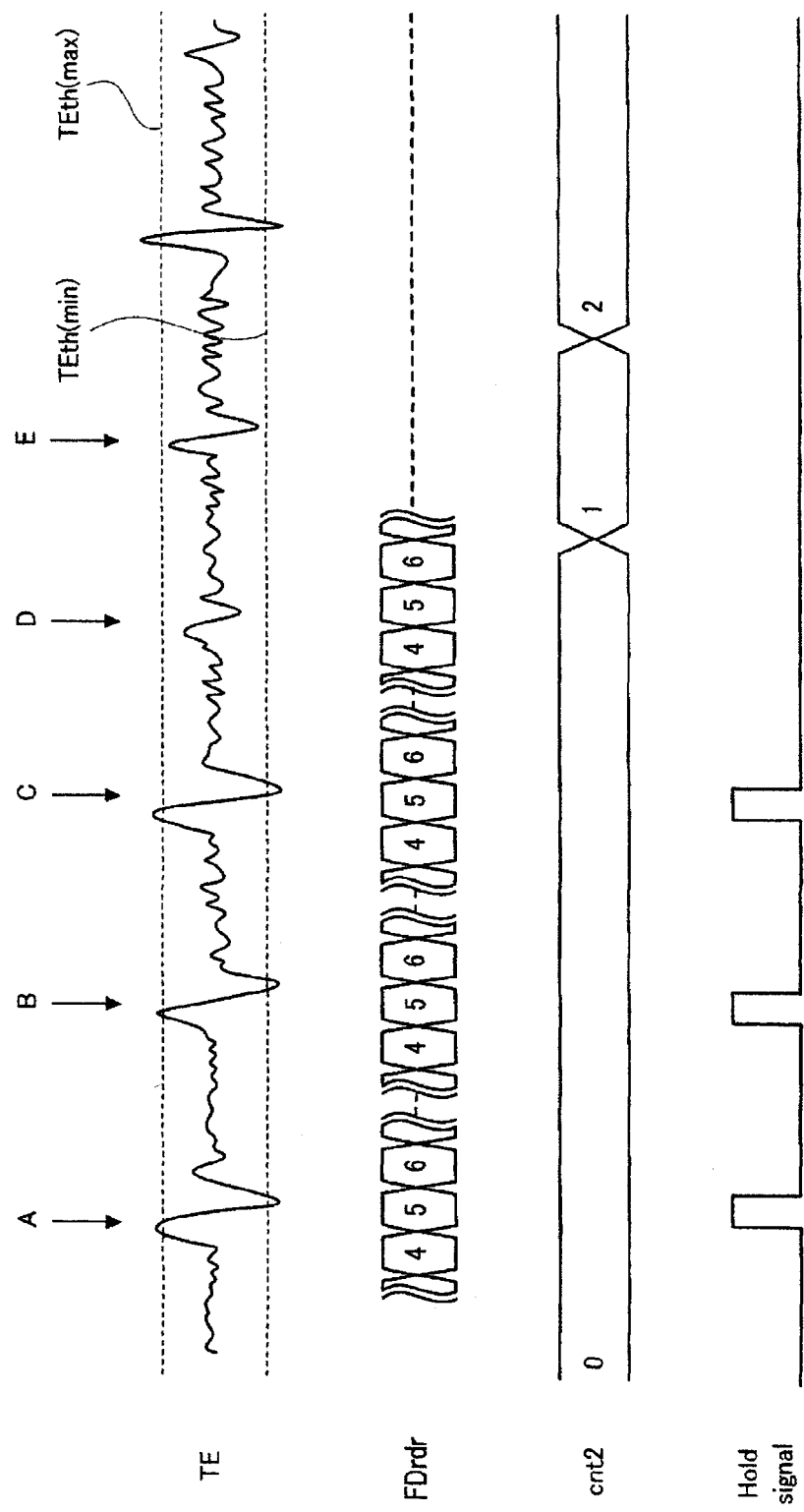
[FIG. 10]

[FIG. 11]
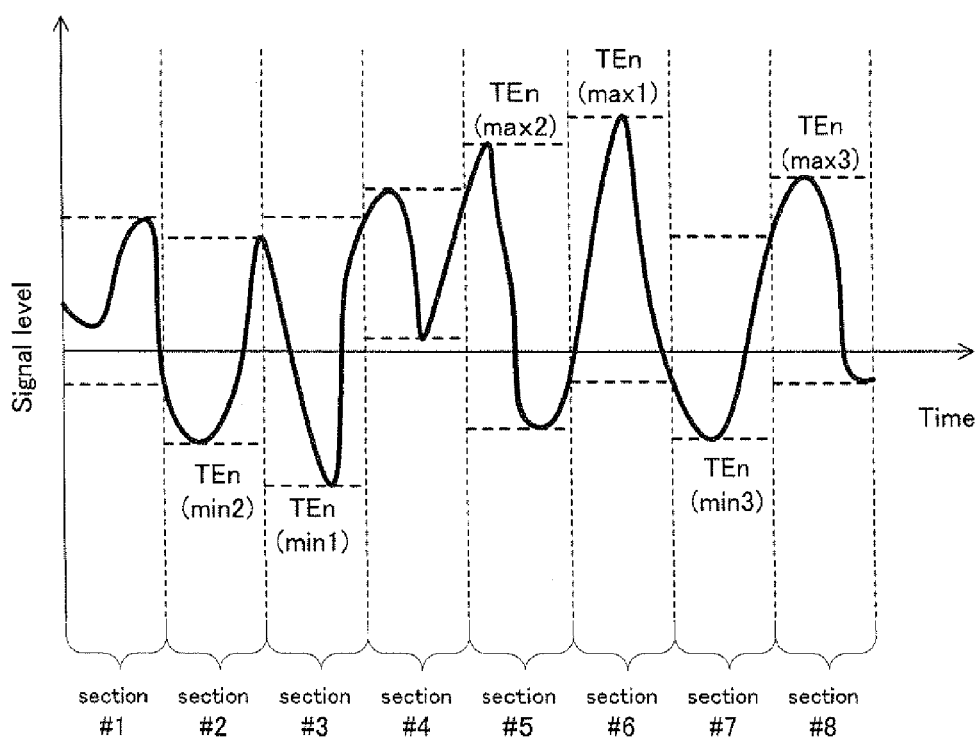

INFORMATION RECORDING DEVICE AND METHOD, AND COMPUTER PROGRAM

TECHNICAL FIELD

The present invention relates to an information recording apparatus and method, such as a DVD recorder, and a computer program which makes a computer function as such an information recording apparatus.

BACKGROUND ART

An information recording medium including a CD, a DVD, and the like has become popular. Such an information recording medium has a recording film, such as an organic dye film and a phase change film, formed on a substrate by spin coating or the like, and a light transmission film with a thickness of 0.6 mm to 1.2 mm, formed on the recording film by spin coating or the like.

In recording data onto the information recording medium, tracking control is performed in order to irradiate laser light at a preferable position. The tracking control is performed to irradiate the laser light near the center of a recording track. More specifically, the tracking control is performed on the basis of a push-pull signal, which indicates a difference between a right-side signal component and a left-side signal component of reflected light of the laser light, with respect to a recording direction.

The tracking control needs to be performed preferably when a disturbance, such as an impact, is exerted on an information recording apparatus and even when there is a defect, such as a scratch and dusts, on the surface of the information recording medium. For example, when the disturbance is exerted, a tracking error signal used for the tracking control is significantly deteriorated, so the tracking control is performed according to the deterioration (in other words, so as to eliminate the deterioration). When there is the defect, although the laser light is irradiated near the center of the recording track, the tracking error signal is significantly deteriorated. Thus, with reference to a defect detection signal generated on the basis of a sum signal (or a RF signal), the tracking control is performed to hold tracking servo. As a method of performing the tracking control when there is such a disturbance and a defect, for example, methods in patent documents 1 and 2 are listed.

Moreover, in addition to the disturbance and the defect, an air bubble with a size of about several tens micrometers (hereinafter referred to as an "air bubble") is generated in some cases in the light transmission film, depending on conditions in a manufacturing process. Even if the air bubble is generated, the aforementioned tracking control needs to be preferably performed.

Patent document 1: Japanese Patent Application Laid Open NO. Hei 11-39678

Patent document 2: Japanese Patent Application Laid Open NO. Hei 8-147721

DISCLOSURE OF INVENTION

Subject to be Solved by the Invention

On the other hand, a Blu-ray Disc has been developed, having a larger recording capacity than those of the CD and the DVD. The Blu-ray Disc uses an objective lens with a larger numeral aperture (NA) (specifically, with a NA of 0.85) to focus blue laser light on a recording surface of the information recording medium. Therefore, when the NA becomes larger, the influence of the dirt and the distortion on the Disc surface becomes larger, thereby the deterioration of the tracking error signal by the air bubble increases. The air bubble, however, deteriorates the tracking error signal but does not have an effect on the sum signal. Thus, there is such a technical problem that the air bubble cannot be detected by the defect detection signal. In addition, the generation of the air bubble significantly deteriorates the tracking error signal although the laser light is irradiated near the center of the recording track. Thus, if the tracking control is performed similarly to the case that the disturbance is exerted, there is such a technical problem that the laser light is irradiated on a recording track except the recording track that is originally to be irradiated with the laser light. In short, there is such a technical problem that it cannot be identified that the deterioration of the tracking error signal is caused by the air bubble.

It is therefore an object of the present invention to provide an information recording apparatus and method, which enable the cause of the deterioration of e.g. the tracking error signal to be preferably identified, and a computer program which makes a computer function as such an information recording apparatus.

Means for Solving the Subject (Information Recording Apparatus)

The above object of the present invention can be achieved by an information recording apparatus provided with: a first judging device for judging whether or not an absolute value of a tracking error signal is greater than or equal to a predetermined first threshold value (in other words, whether or not the tracking error signal deteriorates); a detecting device for detecting, as a detection angle, a rotation angle of an information recording medium when it is judged that the absolute value of the tracking error signal is greater than or equal to the first threshold value; and a second judging device for judging whether or not the judgment that the absolute value of the tracking error signal is greater than or equal to the first threshold value is performed in synchronization with rotation of the information recording medium and at the same detection angle in a row.

According to the information recording apparatus of the present invention, by the operation of the first judging device, it is judged whether or not the absolute value of the tracking error signal used in performing the tracking control is greater than or equal to the predetermined first threshold value. Then, if it is judged by the first judging device that the absolute value of the tracking error signal is greater than or equal to the first threshold value, the rotation angle of the information recording medium when the judgment is performed is detected by the operation of the detecting device, as the detection angle.

After that, by the operation of the second judging device, it is judged whether or not the judgment that the absolute value of the tracking error signal is greater than or equal to the first threshold value is performed in synchronization with the rotation of the information recording medium and at the same detection angle in a row. More specifically, it is judged whether or not the judgment that the absolute value of the tracking error signal is greater than or equal to the first threshold value is performed, at the rotation angle that is once detected at the detection angle, in a row and in a cycle, every time the information recording medium rotates one time.

As a result, if it is judged that the judgment that the absolute value of the tracking error signal is greater than or equal to the first threshold value is performed, in synchronization with the rotation of the information recording medium and at the same detection angle in a row, it can be judged that an air bubble formed in a recording area at a certain rotation angle on the information recording medium is irradiated with laser light every time the information recording medium rotates. By this, it can be recognized that the tracking error signal is generated because of the air bubble formed in a predetermined recording area on the information recording medium.

On the other hand, if it is Judged that the judgment that the absolute value of the tracking error signal is greater than or equal to the first threshold value is not performed, in synchronization with the rotation of the information recording medium and at the same detection angle in a row, it can be judged that the tracking error signal at the detection angle happens to have a value that is greater than or equal to the first threshold value from an influence of a disturbance or the like. By this, it can be recognized that the tracking error signal is generated because of the disturbance, such as an impact, exerted on the information recording apparatus.

As described above, according to the present invention, it is possible to preferably identify the cause of the deterioration of the tracking error signal (i.e. the cause why the absolute value of the tracking error signal becomes the first threshold value or more). More specifically, it is possible to preferably identify whether the deterioration of the tracking error signal is caused by the air bubble or by the disturbance. Moreover, because the cause of the deterioration of the tracking error signal can be preferably identified, it is possible to perform the preferable tracking control according to the cause, as described later.

In one aspect of the information recording apparatus of the present invention, the information recording medium is provided with a spiral or concentric recording track, and the second judging device judges whether or not the judgment that the absolute value of the tracking error signal is greater than or equal to the first threshold value is performed at the detection angle on the recording track adjacent to the recording track in which it is judged that the absolute value of the tracking error signal is greater than or equal to the first threshold value.

According to this aspect, it is judged whether or not the judgment that the absolute value of the tracking error signal is greater than or equal to the first threshold value is performed, at the rotation angle that is once detected as the detection angle, in a row and in a cycle, every time the information recording medium rotates one time. That is, if a certain rotation angle on a first recording track is detected as the detection angle, it is judged whether or not the judgment that the absolute value of the tracking error signal is greater than or equal to the first threshold value is performed, at the detection angle on a second recording track adjacent to the first recording track. After that, it is judged whether or not the judgment that the absolute value of the tracking error signal is greater than or equal to the first threshold value is performed, at the detection angle on an n+1 recording track adjacent to an n recording track (wherein n is an integer of 2 or more) while n is incremented, as occasion demands.

By this, it is possible to preferably identify whether the deterioration of the tracking error signal is caused by the air bubble or by the disturbance.

In another aspect of the information recording apparatus of the present invention, it is further provided with: a first incrementing device for incrementing a first count value; a first controlling device for controlling the first incrementing device to increment the first count value if it is judged the absolute value of the tracking error signal is greater than or equal to the first threshold value, at the detection angle; and a first setting device for setting the first count value to an initial value if it is judged m times in a row (wherein m is an integer of 1 or more) that the absolute value of the tracking error signal is not greater than nor equal to the first threshold value, at the detection angle, the second judging device judging whether or not the first count value is greater than or equal to a predetermined second threshold value.

According to this aspect, the judgment by the second judging device can be preferably performed using the first count value.

At this time, the first controlling device may control the first incrementing device to increment the first count value if it is judged that the absolute value of the tracking error signal is greater than or equal to the first threshold value, at the detection angle until the information recording medium rotates l times (wherein l is an integer of 1 or more) after it is judged that the tracking error signal is greater than or equal to the first threshold value.

In an aspect of the information recording apparatus provided with the first controlling device, as described above, the information recording medium may be provided with a spiral or concentric recording track, and the first controlling device may control the first incrementing device to increment the first count value if it is judged the absolute value of the tracking error signal is greater than or equal to the first threshold value at the detection angle on the recording track adjacent to the recording track in which it is judged that the absolute value of the tracking error signal is greater than or equal to the first threshold value.

By virtue of such construction, the judgment by the second judging device can be preferably performed using the first count value.

In another aspect of the information recording apparatus of the present invention, the first judging device judges whether or not the absolute value of the tracking error signal is greater than or equal to the first threshold value if a defect detection signal is at a low level, the defect detection signal indicating presence or absence of a defect on the information recording medium.

According to this aspect, it is possible to preferably identify whether the deterioration of the tracking error signal is caused by the air bubble or by the disturbance, or by the defect, such as a scratch and dusts, on the information recording medium. More specifically, if the defect detection signal is at a high level, it can be identified that the deterioration of the tracking error signal is caused by the defect, and if the defect detection signal is at a low level, it can be identified that the deterioration of the tracking error signal is caused by the air bubble or the disturbance, in the aforementioned method.

In another aspect of the information recording apparatus of the present invention, the first threshold value is at least one of an average value between a maximum value that can be taken by the tracking error signal and a maximum value of a remaining component of the tracking error signal, and an average value between a minimum value that can be taken by the tracking error signal and a minimum value of the remaining component of the tracking error signal.

According to this aspect, the judgment by the first judging device can be performed preferably or highly accurately.

In another aspect of the information recording apparatus of the present invention, the first threshold value is at least one of an average value between an at least second or more largest maximum value of maximum values in a plurality of sampling sections when the tracking error signal is divided by the plurality of sampling sections and an at least second or more largest maximum value of maximum values in a plurality of sampling sections when a remaining component of the tracking error signal is divided by the plurality of sampling sections, and an average value between an at least second or more smallest minimum value of minimum values in the plurality of sampling sections and an at least second or more smallest minimum value of minimum values in the plurality of sampling sections.

According to this aspect, the judgment by the first judging device can be performed preferably or highly accurately.

In another aspect of the information recording apparatus of the present invention, it is further provided with a holding device for holding tracking servo near the detection angle if it is judged by the second Judging device that the judgment that the absolute value of the tracking error signal is greater than or equal to the first threshold value is performed in synchronization with the rotation of the information recording medium and at the same detection angle in a row.

According to this aspect, without being influenced by the deterioration of the tracking error signal by the air bubble, the tracking control can be preferably performed even in the recording area that the air bubble is generated.

In an aspect of the information recording apparatus provided with the holding device, as described above, the holding device may hold the tracking servo if it is judged that the absolute value of the tracking error signal is greater than or equal to the first threshold value, near the detection angle.

By virtue of such construction, without being influenced by the deterioration of the tracking error signal by the air bubble, the tracking control can be preferably performed even in the recording area that the air bubble is generated.

In an aspect of the information recording apparatus provided with the holding device, as described above, the holding device may hold the tracking servo once while the information recording medium rotates one time.

By virtue of such construction, without being influenced by the deterioration of the tracking error signal by the air bubble, the tracking control can be preferably performed even in the recording area that the air bubble is generated.

In an aspect of the information recording apparatus provided with the holding device, as described above, it may be further provided with a stopping device for stopping the hold of the tracking servo if it is judged by the second judging device that the judgment that the absolute value of the tracking error signal is not greater than nor equal to the first threshold value is performed in synchronization with the rotation of the information recording medium and at the same detection angle in a row.

By virtue of such construction, the tracking control can be preferably performed even in the recording area that the air bubble is generated, and the tracking control can be also preferably performed even in the recording area that the air bubble is not generated.

In an aspect of the information recording apparatus provided with the stopping device, as described above, it may be further provided with: a second incrementing device for incrementing a second count value; a second controlling device for controlling the second incrementing device to increment the second count value if it is judged the absolute value of the tracking error signal is not greater than nor equal to the first threshold value, near the detection angle; and a second setting device for setting the second count value to an initial value if it is judged that the absolute value of the tracking error signal is greater than or equal to the first threshold value, near the detection angle, the stopping device stopping the hold of the tracking servo if the second count value is greater than or equal to a predetermined third threshold value.

By virtue of such construction, by using the second count value, it is possible to preferably change whether to hold the tracking servo or to stop the hold of the tracking servo.

(Information Recording Method)

The above object of the present invention can be also achieved by an information recording method provided with: a first judging process of judging whether or not an absolute value of a tracking error signal is greater than or equal to a predetermined first threshold value; a detecting process of detecting, as a detection angle, a rotation angle of an information recording medium when it is judged that the absolute value of the tracking error signal is greater than or equal to the first threshold value; and a second judging process of judging whether or not the judgment that the absolute value of the tracking error signal is greater than or equal to the first threshold value is performed in synchronization with rotation of the information recording medium and at the same detection angle in a row.

According to the information recording method of the present invention, it is possible to receive various benefits of the aforementioned information recording apparatus of the present invention.

In response to the various aspects of the aforementioned information recording apparatus of the present invention, the information recording method of the present invention can employ various aspects.

(Computer Program)

The above object of the present invention can be also achieved by a computer program for recording control and for controlling a computer provided in the aforementioned information recording apparatus of the present invention (including its various aspects), the computer program making the computer function as at least one portion of the first judging device, the detecting device, and the second judging device.

According to the computer program of the present invention, the aforementioned information recording apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the various aspects of the aforementioned information recording apparatus of the present invention, the computer program of the present invention can also employ various aspects.

The above object of the present invention can be also achieved by a computer program product in a computer-readable medium for tangibly embodying a program of instructions executable by a computer provided in the aforementioned information recording apparatus of the present invention (including its various aspects), the computer program product making the computer function as at least one portion of the first judging device, the detecting device, and the second judging device.

According to the computer program product of the present invention, the aforementioned information recording apparatus of the present invention can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the aforementioned information recording apparatus of the present invention.

These effects and other advantages of the present invention will become more apparent from the embodiment explained below.

As explained above, according to the information recording apparatus of the present invention, it is provided with the first judging device, the detecting device, and the second judging device. According to the information recording method of the present invention, it is provided with the first judging process, the detecting process, and the second judging process. Therefore, it is possible to preferably identify the cause of the deterioration of the tracking error signal.

BRIEF DESCRIPTION OF DRAWINGS

FIG. 1 is a block diagram conceptually showing the basic structure of an information recording/reproducing apparatus in an embodiment.

FIG. 2 are cross sectional views conceptually showing an optical disc 100 loaded onto the information recording/reproducing apparatus in the embodiment.

FIG. 3 is a flowchart conceptually showing a flow of the recording operation of the information recording/reproducing apparatus in the embodiment.

FIG. 4 is a flowchart conceptually showing a flow of an "operation of detecting the deterioration of a tracking error signal TE by an air bubble" of the recording operation of the information recording/reproducing apparatus in the embodiment.

FIG. 5 is a graph conceptually showing a threshold value of the tracking error signal.

FIG. 6 is a timing chart conceptually showing, along a time axis, various control signals used in the information recording/reproducing apparatus in the embodiment, in the "operation of detecting the deterioration of the tracking error signal by the air bubble".

FIG. 7 is a flowchart conceptually showing another flow of the "operation of detecting the deterioration of the tracking error signal TE by the air bubble" of the recording operation of the information recording/reproducing apparatus in the embodiment.

FIG. 8 is a flowchart conceptually showing a flow of an "operation of holding tracking servo in a position in which the deterioration of the tracking error signal is generated by the air bubble" of the recording operation of the information recording/reproducing apparatus in the embodiment.

FIG. 9 is a timing chart conceptually showing, along a time axis, each of the tracking error signal TE and a tracking servo control signal used in the information recording/reproducing apparatus in the embodiment, in the "operation of holding tracking servo in the position in which the deterioration of the tracking error signal is generated by the air bubble".

FIG. 10 is a timing chart conceptually showing, along a time axis, various control signals used in the information recording/reproducing apparatus in the embodiment, in the "operation of holding tracking servo in the position in which the deterioration of the tracking error signal is generated by the air bubble".

FIG. 11 is a graph conceptually showing another threshold value of the tracking error signal.

DESCRIPTION OF REFERENCE CODES 1 information recording/reproducing apparatus
11 spindle motor
12 optical pickup
13 driver
14 recording circuit
15 FG generation circuit
16 RF amplifier
17 DSP
18 decoder
19 microcomputer
191 first judgment circuit
192 rotation angle detection circuit
193 second judgment circuit
194 hold circuit
195 stop circuit
20 counter
21 memory
100 optical disc
140 air bubble
TE tracking error signal
TEth threshold value

BEST MODE FOR CARRYING OUT THE INVENTION

Hereinafter, the best mode for carrying out the present invention will be explained in each embodiment in order with reference to the drawings.

(Basic Structure)

Firstly, with reference to FIG. 1, a description will be given on the basic structure of an information recording/reproducing apparatus, which is an embodiment of the information recording apparatus and the information reproducing apparatus of the present invention. FIG. 1 is a block diagram conceptually showing the basic structure of an information recording/reproducing apparatus in an embodiment. Incidentally, an information recording/reproducing apparatus 1 has both a function of recording data onto an optical disc 100 and a function of reproducing the data recorded on the optical disc 100.

As shown in FIG. 1, the information recording/reproducing apparatus 1 in the embodiment is provided with: a spindle motor 11; an optical pickup 12; a driver 13; a recording circuit 14; a FG generation circuit 15; a RF (Radio Frequency) amplifier 16; a DSP (Digital Signal Processor) 17; a decoder 18; a microcomputer 19; a counter circuit 20; and a memory 21.

The spindle motor 11 is intended to rotate and stop the optical disc 100 and operates in accessing the optical disc 100. More specifically, the spindle motor 11 is adapted to rotate the optical disc 100 at a predetermined speed and stop it under spindle servo outputted from the driver 13.

The optical pickup 12 is provided with a semiconductor laser diode; an objective lens; and the like, in order to record data onto the optical disc 100 and reproduce the data recorded on the optical disc 100. More specifically, if recording the data onto the optical disc 100, the optical pickup 12 irradiates the optical disc 100 with laser light LB which has a relatively large first power and which is modulated on the basis of a strategy signal outputted from the driver 13. On the other hand, if reproducing the data recorded on the optical disc 100, the optical pickup 12 irradiates the optical disc 100 with the laser light LB which has a relatively small second power.

Moreover, the optical pickup 12 is provided with a four-division detection circuit in which a light receiving area is divided into four areas of A, B, C, and D. On the basis of the reflected light of the received laser light LB, the optical pickup 12 supplies the RF amplifier 16 with a RF signal, which is the sum of the intensities of the reflected lights received in the respective four light receiving areas (i.e. A+B+C+D), and supplies the driver 13 with a tracking error signal TE, which is a difference between the sum of the intensities of the reflected lights received in the respective A and D of the four light receiving areas and the sum of the intensities of the reflected lights received in the respective B and D of the four light receiving areas.

The driver 13 supplies the spindle motor 11 with a spindle servo control signal and operates the spindle motor 11, under the control of the microcomputer 19. Moreover, the driver 13 generates a tracking servo control signal on the basis of the tracking error signal TE and supplies the tracking servo control signal to the optical pickup 12, to thereby perform the tracking control of the optical pickup 12, under the control of the microcomputer 19. Moreover, the driver 13 generates a focus servo control signal on the basis of a focus error signal and supplies the focus servo control signal to the optical pickup 12, to thereby perform focus control of the optical pickup 12, under the control of the microcomputer 19. Moreover, the driver 13 supplies the optical pickup 12 with a laser driving signal which defines the waveform of the laser light LB irradiated from the optical pickup 12, on the basis of a record signal supplied from the recording circuit 14, to thereby drive the semiconductor laser apparatus disposed in the optical pickup 12.

The recording circuit 14 performs a modulation process, a coding process, an error correction code appending process, and the like on video data, audio data, and other various data supplied from the exterior of the information recording/reproducing apparatus 1, to thereby generate the record signal. The generated record signal is outputted to the driver 13, and the driver 13 drives the semiconductor laser apparatus disposed in the optical pickup 12, on the basis of the record signal.

The FG generation circuit 15 generates a cycle detection signal (hereinafter referred to as a "FG signal" and outputs it to the DSP 17 every time the optical disc 100 rotates by a certain angle. More specifically, the FG generation circuit 15 may be constructed to generate the cycle detection signal every time the optical disc 100 rotates, for example, 10 degrees. At this time, it is preferable to generate the FG signal with an identification code corresponding to the rotation angle of the optical disc 100 with respect to a predetermined reference position. For example, if the rotation angle of the optical disc 100 is 0 to 10 degrees, it is preferable to generate the FG signal with an identification code of #1, if 10 to 20 degrees, the FG signal with an identification code of #2, and if 10×(r−1) to 10×r degrees, the FG signal with an identification code of #r. In this case, it is recognized that the optical disc 100 rotates one time when the cycle detection signal is detected 36 times.

The RF amplifier 16 amplifies the output signal of the optical pickup 12, i.e. the reflected light of the laser light LB, and outputs the amplified signal to the DSP 17.

The DSP 17 performs a digital signal process on the signal outputted form the RF amplifier 16 and the signal outputted from the FG generation circuit 15, under the control of the microcomputer 19. In performing the digital signal process, the DSP 17 exchanges data with various function blocks in the microcomputer 19 described later as occasion demands.

The decoder 18 performs a decoding process on the signal on which the digital signal process is performed by the DSP 17 (in particular, the signal outputted from the RF amplifier 16), to thereby generate the video data, the audio data, and the other various data. The video data, the audio data, and the other various data which are generated are outputted to external output equipment, such as a display and a speaker, and are reproduced as video images and sounds.

The microcomputer 19 is connected through a data bus to the driver 13, the recording circuit 14, the DSP 17, the decoder 18, the counter circuit 20, the memory 21 and the like, and gives instructions to them to thereby control the entire information recording/reproducing apparatus 1. Typically, software or firmware for operating the microcomputer 19 is stored in the memory 21.

In particular, the information recording/reproducing apparatus 1 in the embodiment is provided, in the micro computer 19, with: a first judgment circuit 191; a rotation angle detection circuit 192; a second judgment circuit 193; a hold circuit 194; and a stop circuit 195, as function blocks which are realized by the operation of a program.

The first judgment circuit 191 constitutes one specific example of the "first judging device" of the present invention. The first judgment circuit 191 is adapted to judge whether or not the tracking error signal TE is greater than or equal to a threshold value TEth determined in advance or determined as occasion demands. A result of the judgment is outputted to the detection circuit 192 and the second judgment circuit 193.

The rotation angle detection circuit 192 constitutes one specific example of the "detecting device" of the present invention. The rotation angle detection circuit 192 is adapted to detect the rotation angle of the optical disc 100 on the basis of the FG signal outputted form the FG generation circuit 15. In particular, the rotation angle detection circuit 192 is adapted to detect, as a detection angle, the rotation angle of the optical disc 100 when it is judged by the first judgment circuit 191 that the tracking error signal TE is greater than or equal to a threshold value TEth determined in advance or determined as occasion demands. The detection angle is outputted to the second judgment circuit 193.

The second judgment circuit 193 constitutes one specific example of the "second judging device" of the present invention. The second judgment circuit 193 is adapted to judge whether or not the tracking error signal TE is greater than or equal to a threshold value TEth determined in advance or determined as occasion demands, at the detection angle that the optical disc 100 passes through in each one rotation, in a row and in a cycle in synchronization with the rotation of the optical disc 100. A result of the judgment by the second judgment circuit 193 is outputted to the hold circuit 194 and the stop circuit 195.

The hold circuit 194 constitutes one specific example of the "holding device" of the present invention. The hold circuit 194 is adapted to output, to the driver 13, an instruction indicating to hold the tracking servo near the detection angle if it is judged by the second judgment circuit 193 that the first judgment circuit 192 judges that the tracking error signal TE is greater than or equal to a threshold value TEth determined in advance or determined as occasion demands, in a row and in a cycle in synchronization with the rotation of the optical disc 100. That is, the instruction indicating to hold the tracking servo by the hold circuit 194 is given to the driver 13, and the driver 13 performs the tracking control while holding the tracking servo.

The stop circuit 195 constitutes one specific example of the "stopping device" of the present invention. The stop circuit 195 is adapted to output the instruction indicating to stop the holding of the tracking servo, to the driver 13. That is, when the instruction indicating to hold the tracking servo by the hold circuit 194 is given to the driver 13, if the instruction indicating to stop the holding of the tracking servo is given from the stop circuit 195 to the driver 13, the driver 13 stops the holding of the tracking servo and performs normal tracking control.

Incidentally, a detailed description will be given later on more specific operations of the first judgment circuit 191, the rotation angle detection circuit 192, the second judgment circuit 193, the hold circuit 194, and the stop circuit 195 described above (refer to FIG. 3 to FIG. 10).

The counter circuit 20 constitutes one specific example of the "first incrementing device", the "first controlling device", the "first setting device", the "second incrementing device", the "second controlling device", and the "second setting device" of the present invention. The counter circuit 20 is adapted to increment, decrement, and reset a count value.

The memory 21 is used in the general data processing of the information recording/reproducing apparatus 1. More specifically, the memory 21 is provided with: a ROM area in which various programs (i.e. firmware) required for the operations of the information recording/reproducing apparatus 1 are stored; a buffer for temporarily storing the data; a RAM area in which a parameter required for the operation of the firmware program or the like is stored; and the like.

Now, with reference to FIG. 2, a description will be given on the optical disc 100 loaded onto the information recording/reproducing apparatus 1 in the embodiment. FIG. 2 are cross sectional views conceptually showing the optical disc 100 loaded onto the information recording/reproducing apparatus 1 in the embodiment.

As shown in FIG. 2(*a*), the optical disc 100 has a recording film 120, such as an organic dye film and a phase change film, formed on a substrate 110 by using spin coating or the like, and a light transmission film 130 formed on the recording film 120 by spin coating or the like.

The light transmission film 130 is about 1.2 mm thick in the case of a CD, which is one specific example of the optical disc 100, about 0.6 mm thick in the case of a DVD, which is one specific example of the optical disc 100, and about 0.1 mm thick in the case of a Blu-ray Disc, which is one specific example of the optical disc 100.

As shown in FIG. 2(*b*), an air bubble 140 with a size of about several tens micrometers is generated in some cases in the light transmission film 130, depending on conditions in a manufacturing process for the optical disc 100. If the recording film 120 is irradiated with the laser light LB through the air bubble 140, even if the laser light LB is properly irradiated near the center of the recording track, the tracking error signal TE deteriorates. On the other hand, a PE (Pull-in Error) signal does not deteriorate, which is a DC component of the RF signal. This stands out, particularly in the Blu-ray Disc, on which the objective lens with the relatively large NA is used to relatively reduce the distance between the objective lens and the surface of the optical disc 100.

The information recording/reproducing apparatus 1 in the embodiment properly detects the air bubble 140 and properly performs the tracking control without being influenced by the deterioration of the tracking error signal TE by the air bubble 140. Hereinafter, a more detailed description will be given on the operations of the information recording/reproducing apparatus 1.

(Operation Principle)

a (1) Recording Operation

Firstly, with reference to FIG. 3, a description will be given on a flow of the recording operation of the information recording/reproducing apparatus 1 in the embodiment. FIG. 3 is a flowchart conceptually showing the flow of the recording operation of the information recording/reproducing apparatus 1 in the embodiment.

As shown in FIG. 3, firstly, the optical disc 100 is loaded on the information recording/reproducing apparatus 1 (step S101).

Then, mainly by the operations of the first judgment circuit 191, the rotation angle detection circuit 192, and the second judgment circuit 193 or the like, the deterioration of the tracking error signal TE by the air bubble is detected (step S102). Then, if the deterioration of the tracking error signal TE by the air bubble 140 is detected, the tracking servo is held in the position in which the tracking error signal TE deteriorates due to the air bubble 140, mainly by the operations of the hold circuit 194 and the stop circuit 195 or the like (step S103).

Incidentally, a detailed description will be given later on an operation of detecting the deterioration of the tracking error signal TE by the air bubble 140 and an operation of holding the tracking servo in the position in which the tracking error signal TE deteriorates by the air bubble 140 (refer to FIG. 4 to FIG. 6, and FIG. 7 to FIG. 9, respectively).

At this time, the operation of recording the data onto the optical disc 100 is simultaneously performed (step S104).

After that, it is judged whether or not the recording operation is to be ended (step S105). For example, it is judged whether or not an instruction indicating to end the recording operation is given by a user, or whether or not the recording of all the data to be recorded onto the optical disc 100 is ended.

As a result of the judgment in the step S105, if it is judged that the recording operation is to be ended (the step S105: Yes), the recording operation is ended. At this time, a finalize process and an ejection process may be performed, if necessary.

On the other hand, as a result of the judgment in the step S105, if it is judged that the recording operation is not to be ended (the step S105: No), the operational flow returns to the step S102 to the step S104 again, to continue the recording operation.

(2) Operation of Detecting Deterioration of Tracking Error Signal TE by Air Bubble Next, with reference to FIG. 4 to FIG. 7, an explanation will be given on a flow of the "operation of detecting the deterioration of the tracking error signal TE by the air bubble 140" of the recording operation of the information recording/reproducing apparatus 1 in the embodiment. Incidentally, here, the flow of the detection operation will be discussed with reference to FIG. 4 and will be discussed in more detail with reference to FIG. 5 and FIG. 6, as occasion demands. FIG. 4 is a flowchart conceptually showing the flow of the "operation of detecting the deterioration of the tracking error signal TE by the air bubble 140" of the recording operation of the information recording/reproducing apparatus 1 in the embodiment.

As shown in FIG. 4, firstly, by the operation of the counter circuit 20, a counter cnt1 is set to "0" as an initial value (step S201).

Then, the threshold value TEth, used in detecting the deterioration of the tracking error signal TE, is set (step S202). The set threshold value TEth indicates the allowable range of the tracking error signal TE. As the allowable range, an upper limit threshold value TEth(max) and a lower limit threshold value TEth(min) are set. Specifically, if the tracking error signal TE is less than the upper limit threshold value TEth (max) and is greater than the lower limit threshold value TEth(min), it is judged that the tracking error signal does not deteriorate. On the other hand, if the tracking error signal TE is greater than or equal to the upper limit threshold value TEth(max) or is less than or equal to the lower limit threshold value TEth(min), it is judged that the tracking error signal deteriorates. The judgment is performed by the operation of the first judgment circuit 191.

Incidentally, in the embodiment, the state that "the tracking error signal TE is greater than or equal to the threshold value TEth" indicates the state that the tracking error signal TE is greater than or equal to the upper limit threshold value TEth(max) or is less than or equal to the lower limit threshold value TEth(min). On the other hand, the state that "the tracking error signal TE is not greater than nor equal to the threshold value TEth" indicates the state that the tracking error signal TE is not greater than nor equal to the upper limit threshold value TEth(max) and is not less than nor equal to the lower limit threshold value TEth(min).

Now, with reference to FIG. 5, a description will be given on a method of setting the upper limit threshold value TEth(max) and the lower limit threshold value TEth(min). FIG. 5 is a graph conceptually showing the threshold value TEth of the tracking error signal TE.

As shown in FIG. 5, the tracking error signal TE includes a signal component that is too high-frequency to be followed by the tracking servo. The high-frequency signal component is referred to as a remaining component. For example, it is assumed that the remaining component of the tracking error signal TE obtained by rotating the optical disc 100 one time has a maximum value of TEn(max) and a minimum value of TEn(min).

Moreover, it is assumed that the tracking error signal TE has a maximum value of TE(max) and a minimum value of TE(min). The maximum value of TE(max) and the minimum value of TE(min) correspond to the maximum value and the minimum value of the tracking error signal TE obtained in rotating the optical disc 100 at least one or more time(s), with the tracking servo open.

In the embodiment, the upper limit threshold value TEth(max) is set to an average value of the maximum value TE(max) of the tracking error signal TE and the maximum value TEn(max) of the remaining component. That is, TEth(max)=(TE(max)+TEn(max))/2.

In the same manner, the lower limit threshold value TEth(min) is set to an average value of the minimum value TE(min) of the tracking error signal TE and the minimum value TEn(min) of the remaining component. That is, TEth(min)=(TE(min)+TEn(min))/2.

Of course, this method of setting the threshold value TEth is one specific example, and the threshold value may be determined by another setting method. The point is that it is only necessary to set the threshold value that allows the judgment of whether or not the tracking error signal deteriorates.

In FIG. 4 again, it is then judged whether or not a defect is detected under the control of the microcomputer 19 (step S203). The detection of the defect is performed on the basis of a defect detection signal. The defect detection signal reaches a high level if the PE signal, which is the DC component of the RF signal, is less than a certain value, and the defect detection signal reaches a low level if the PE signal, which is the DC component of the RF signal, is greater than or equal to the certain value. And, when the defect detection signal is at the high level, it is recognized that the defect is detected.

As a result of the judgment in the step S203, if it is judged that the defect is detected (the step S203: Yes), the operational flow returns to the step S201 while performing the tracking control which is performed when the defect is detected. More specifically, if the defect is detected, it is preferable to perform an operation of holding the tracking servo described later.

On the other hand, as a result of the judgment in the step S203, if it is judged that the defect is not detected (the step S203: No), then it is judged whether or not the tracking error signal TE is greater than or equal to the threshold value TEth (i.e. greater than or equal to the upper limit threshold value TEth(max) or is less than or equal to the lower limit threshold value TEth(min)), by the operation of the first judgment circuit 191 (step S204). That is, it is judged whether or not the tracking error signal deteriorates.

As a result of the judgment in the step S204, if it is judged that the tracking error signal TE is not greater than nor equal to the upper limit threshold value TEth(max) and is not less than nor equal to the lower limit threshold value TEth(min) (the step S204: No), it is considered that the tracking error signal TE does not deteriorate. Therefore, the operational flow returns to the step S203 to continue the processes in the step S203 and the step S204.

On the other hand, as a result of the judgment in the step S204, if it is judged that the tracking error signal TE is greater than or equal to the upper limit threshold value TEth(max) or is less than or equal to the lower limit threshold value TEth(min) (the step S204: Yes), it is considered that the tracking error signal TE deteriorates.

At this time, by the operation of the rotation angle detection circuit 192, a rotation angle FGadr of the optical disc 100 is detected at a time point at which it is judged that the tracking error signal TE is greater than or equal to the upper limit threshold value TEth(max) or is less than or equal to the lower limit threshold value TEth(min) (step S205). The rotation angle FGadr detected here may be the FG signal itself outputted from the FG generation circuit 15, or a numerical value which indicates the actual rotation angle.

After that, by the operation of the second judgment circuit 193, it is judged whether or not the counter cnt1 is "0" (step S206). In other words, it is judged whether or not it is judged, for the first time, that the tracking error signal TE is greater than or equal to the upper limit threshold value TEth(max) or is less than or equal to the lower limit threshold value TEth(min), at the rotation angle FGadr detected in the step S205. If it is judged, for the first time, that the tracking error signal TE is greater than or equal to the upper limit threshold value TEth(max) or is less than or equal to the lower limit threshold value TEth(min), at the rotation angle FGadr detected in the step S205, the counter cnt1 is "0". On the other hand, if it was also previously judged that the tracking error signal TE is greater than or equal to the upper limit threshold value TEth(max), or is less than or equal to the lower limit threshold value TEth(min), at the rotation angle FGadr detected in the step S205, the counter cnt1 takes a numerical value except "0".

As a result of the judgment in the step S206, if it is judged that the counter cnt1 is "0" (the step S206: Yes), the counter cnt1 is incremented by "1" by the operation of the counter circuit 20 (step S207). After that, the rotation angle FGadr detected in the step S205 is stored into a variable FG1 in the memory 21 (step S210). After that, the operational flow returns to the step S203 to continue the processes.

On the other hand, as a result of the judgment in the step S206, if it is judged that the counter cnt1 is not "0" (the step S206: No), the counter cnt1 is incremented by "1" by the operation of the counter circuit 20 (the step S207).

After that, by the operation of the second judgment circuit 193, it is judged whether or not the rotation angle FGadr detected in the step S205 has the same value as that of the variable FG1 in the memory 21 (step S208). That is, it is judged whether or not the previously detected rotation angle FGadr is the same as the rotation angle FGadr detected after the optical disc 100 rotates substantially one time. In other words, it is judged whether or not the rotation angle FGadr when it is judged that the tracking error signal TE is greater than or equal to the upper limit threshold value TEth(max) or is less than or equal to the lower limit threshold value TEth(min), is the same as the rotation angle FGadr when it is judged again that the tracking error signal TE is greater than or equal to the upper limit threshold value TEth(max) or is less than or equal to the lower limit threshold value TEth(min) in recording tracks adjacent to the record tack when the judgment is previously performed.

As a result of the judgment in the step S208, if it is judged that the rotation angle FGadr detected in the step S205 has the same value as that of the variable FG1 in the memory 21 (the step S208: Yes), it can be judged that the deterioration of the tracking error signal TE detected in the step S204 is detected in a cycle and in a row in synchronization with the rotation of the optical disc 100.

Then, by the operation of the second judgment circuit 193, it is judged whether or not the counter cnt1 is greater than or equal to 3 (step S209).

As a result of the judgment in the step S209, if it is judged that the counter cnt1 is not greater than nor equal to 3 (the step S209: No), the operational flow returns to the step S203 again to continue the processes.

On the other hand, as a result of the judgment in the step S209, if it is judged that the counter cnt1 is greater than or equal to 3 (the step S209: Yes), it can be judged that the deterioration of the tracking error signal TE detected in the step S204 is detected in a cycle and three times or more in a row, in synchronization with the rotation of the optical disc 100. Therefore, it can be considered that the deterioration of the tracking error signal TE detected in the step S204 is caused by the air bubble 140. In other words, it can be recognized that the air bubble 140 is generated in the position at which the rotation angle FGadr has the same value as that of the variable FG1 in the memory 21. Thus, it goes to the servo hold operation in the deterioration position of the tracking error signal by the air bubble.

On the other hand, as a result of the judgment in the step S208, if it is judged that the rotation angle FGadr detected in the step S205 does not have the same value as that of the variable FG1 in the memory 21 (the step S208: No), it can be judged that the deterioration of the tracking error signal TE detected in the step S204 is not detected in a cycle in synchronization with the rotation of the optical disc 100. Therefore, it can be considered that the deterioration of the tracking error signal TE detected in the step S204 is caused not by the air bubble 140 but by a disturbance. In other words, it can be recognized that the disturbance occurs accidentally in the position at which the rotation angle FGadr has the same value as that of the variable FG1 in the memory 21. Thus, the operational flow returns to the step S201 to reset the counter cnt1 to 0, and then the processes after the step S201 are continued.

Incidentally, an aspect of a change in various signals used in the information recording/reproducing apparatus 1 performing the operation of detecting the deterioration of the tracking error signal TE by the air bubble 140 will be explained in more detail with reference to FIG. 6. FIG. 6 is a timing chart conceptually showing, along a time axis, the various control signals used in the information recording/reproducing apparatus 1 in the embodiment, in the "operation of detecting the deterioration of the tracking error signal TE by the air bubble 140".

FIG. 6 shows, in the top part, the tracking error signal TE, the upper limit threshold value TEth(max), and the lower limit threshold value TEth(min). If the tracking error signal TE is greater than or equal to the upper limit threshold value TEth(max) or is less than the lower limit threshold value TEth(min), a bubble detection signal reaches a high level. The bubble detection signal is a signal indicating a result of the judgment in the step S204, and corresponds to the output of the first judgment circuit 191.

In FIG. 6, the bubble detection signal reaches the high level in timing of A. When the bubble detection signal reaches the high level, the rotation angle FGadr is detected by the rotation angle detection circuit 192. In FIG. 6, the FG signal when the bubble detection signal reaches the high level has an identification code of #8. Therefore, the rotation angle FGadr is 70 to 80 degrees. Moreover, the counter cnt1 is incremented to "1".

After that, in the timing that the rotation angle FGadr is substantially 70 to 80 degrees, a bubble detection window is open. If the bubble detection signal reaches the high level while the bubble detection window is open, the counter cnt1 is incremented by "1" and the value of the counter cnt1 becomes "1". On the other hand, if the bubble detection signal reaches a low level while the bubble detection window is open, the counter cnt1 is reset to "0". That is, the bubble detection window is used to judge whether the bubble detection signal reaches the high level at the same rotation angle FGadr, in a cycle and in a row in synchronization with the rotation of the optical disc 100.

Moreover, the bubble detection window may be open even in the timing that the rotation angle FGadr is substantially 60 to 70 degrees and in the timing that the rotation angle FGadr is substantially 80 to 90 degrees, in addition to the timing that the rotation angle FGadr is substantially 70 to 80 degrees. In other words, the bubble detection window may be open even in the timing that the rotation angle FGadr of the optical disc 100 approximates or come close to the value of the variable FG1 in the memory 21, in addition to the timing that the rotation angle FGadr of the optical disc 100 has the same value as that of the variable FG1 in the memory 21.

Then, in timing of B at which the rotation angle FGadr is 70 to 80 degrees again after the optical disc 100 rotates one time, the bubble detection signal reaches the low level. Therefore, it can be considered that the deterioration of the tracking error signal TE detected in the timing of A is caused not by the air bubble 140 but by e.g. the disturbance. Thus, the counter cnt1 is reset to "0", and moreover, the bubble detection window is set to be always open.

Then, in timing of C after the optical disc 100 rotates several times, the bubble detection signal reaches the high level again. The rotation angle FGadr at this time is 40 to 50 degrees. Thus, the bubble detection window becomes open in the timing that the rotation angle becomes 40 to 50 degrees. Moreover, the counter cnt1 is incremented by "1", and the value of the counter cnt1 becomes "1".

Then, even in timing of D at which the rotation angle FGadr is 40 to 50 degrees again after the optical disc 100 rotates one time, the bubble detection signal reaches the high level. Therefore, the counter cnt1 is incremented by "1", and the counter cnt1 becomes "2".

Then, even in timing of E at which the rotation angle FGadr is 40 to 50 degrees again after the optical disc 100 rotates one time, the bubble detection signal reaches the high level. Therefore, the counter cnt1 is incremented by "1", and the counter cnt1 becomes "3". Here, since the counter cnt1 is greater than or equal to "3", the operation is shifted to the operation of holding the tracking servo described later at this time point.

Incidentally, in the flowchart shown in FIG. 4, it is judged whether or not the rotation angle FGadr of the optical disc 100 has the same value as that of the variable FG1 in the memory 21 when the tracking error signal TE is greater than or equal to the upper limit threshold value TEth(max) or is less than the lower limit threshold value TEth(min). However, from another viewpoint, it may be judged whether or not the tracking error signal TE is greater than or equal to the upper limit threshold value TEth(max) or is less than the lower limit threshold value TEth(min) when the rotation angle FGadr of the optical disc 100 has the same value as that of the variable FG1 in the memory 21 (i.e. in synchronization with the timing that the optical disc 100 rotates one time). The operation in this case will be explained with reference to FIG. 7. FIG. 7 is a flowchart conceptually showing another flow of the "operation of detecting the deterioration of the tracking error signal TE by the air bubble 140" of the recording operation of the information recording/reproducing apparatus 1 in the embodiment.

As shown in FIG. 7, the operations from the step S201 to the step 205 are performed similarly to the operation example shown in FIG. 4.

Following the operation in the step S205, the counter cnt1 is incremented by "1" by the operation of the counter circuit 20 (step S207), and the rotation angle detected in the step S205 is stored into the variable FG1 in the memory 21 (step S210).

Then, under the control of the microcomputer 19, it is judged whether or not the defect is detected (step S213).

As a result of the judgment in the step S213, if it is judged that the defect is detected (the step S213: Yes), the operational flow returns to the step S201 while performing the tracking control which is performed when the defect is detected.

On the other hand, as a result of the judgment in the step S213, if it is judged that the defect is not detected (the step S213; No), then the current rotation angle FGadr of the optical disc 100 is detected (step S215).

After that, by the operation of the second judgment circuit 193, it is judged whether or not the current rotation angle FGadr of the optical disc 100 detected in the step S215 has the same value as that of the variable FG1 in the memory 21 (step S218).

As a result of the judgment in the step S218, if it is judged that the current rotation angle FGadr of the optical disc 100 detected in the step S215 does not have the same value as that of the variable FG1 in the memory 21 (the step S218: No), the operational flow returns to the step S213 to rotate the optical disc 100 until the rotation angle FGadr of the optical disc 100 has the same value as that of the variable FG1 in the memory 21 while the defect detection is performed.

On the other hand, as a result of the judgment in the step S218, if the current rotation angle FGadr of the optical disc 100 detected in the step S215 has the same value as that of the variable FG1 in the memory 21 (the step S218: Yes), it is judged whether or not the tracking error signal TE generated at the rotation angle FGadr is greater than or equal to the threshold value TEth (i.e. is greater than or equal to the upper limit threshold value TEth(max) or is less than or equal to the lower limit threshold value TEth(min)) by the operation of the first judgment circuit 191 (step S214). That is, it is judged whether or not the tracking error signal TE deteriorates.

As a result of the judgment in the step S214, if the tracking error signal TE is not greater than nor equal to the upper limit threshold value TEth(max) and is not less than nor equal to the lower limit threshold value TEth(min) (the step S214: No), it can be judged that the deterioration of the tracking error signal TE detected in each of the step S204 and the step S214 is not detected in a cycle in synchronization with the rotation of the optical disc 100. Therefore, it can be considered that the deterioration of the tracking error signal detected in the step S204 and the step S214 is caused not by the air bubble 140 but by the disturbance. Thus, the operational flow returns to the step S201 to reset the counter cnt1 to 0, and then the processes after the step S201 are continued.

However, until it is judged that the tracking error signal TE deteriorates at the same rotation angle, a plurality of times in a row, the operational flow may return to the step S213 without resetting the counter cnt1.

On the other hand, as a result of the judgment in the step S214, if the tracking error signal TE is greater than or equal to the upper limit threshold value TEth(max) or is less than or equal to the lower limit threshold value TEth(min) (the step S214: Yes), it can be judged that the deterioration of the tracking error signal TE detected in each of the step S204 and the step S214 is detected in a cycle and in a row in synchronization with the rotation of the optical disc 100. After that, the counter cnt1 is incremented by "1" (step to S207).

Then, by the operation of the second judgment circuit 193, it is judged whether or not the counter cnt1 is greater than or equal to 3 (the step S209).

As a result of the judgment in the step S209, if it is judged that the counter cnt1 is not greater than nor equal to 3 (the step S209: NO), the operational flow returns to the step S213 again to continue the process.

On the other hand, as a result of the judgment in the step S209, if it is judged that the counter cnt1 is greater than or equal to 3 (the step S209: Yes), it can be judged that the deterioration of the tracking error signal TE detected in each of the step S204 and the step S214 is detected in a cycle and three times or more in a row, in synchronization with the rotation of the optical disc 100. Therefore, it can be considered that the deterioration of the tracking error signal TE detected in each of the step S204 and the step S214 is caused by the air bubble 140. Thus, it goes to the servo hold operation in the deterioration position of the tracking error signal by the air bubble.

As described above, the operation shown in FIG. 7 corresponds to the operation using the "bubble detection window" in FIG. 6. Moreover, obviously the information recording/reproducing apparatus 1 may perform an operation combining, if necessary, the operation shown in FIG. 7 and the operation shown in FIG. 4.

(3) Operation of Holding Tracking Servo in Deterioration Position of Tracking Error Signal by Air Bubble Next, with reference to FIG. 8 to FIG. 10, a description will be given on a flow of the "operation of holding the tracking servo in a position at which the deterioration of the tracking error signal is generated by the air bubble 140" of the recording operation of the information recording/reproducing apparatus 1 in the embodiment. Incidentally, here, a description will be given on the flow of the hold operation with reference to FIG. 8, and a more detailed description will be given with reference to FIG. 9 and FIG. 10, as occasion demands. FIG. 8 is a flowchart conceptually showing the flow of the "operation of holding the tracking servo in the position at which the deterioration of the tracking error signal is generated by the air bubble 140" of the recording operation of the information recording/reproducing apparatus 1 in the embodiment.

As shown in FIG. 8, firstly, a counter cnt2 is set to "0" as an initial value by the operation of the counter circuit 20 (step S301).

Then, by the operation of the second judgment circuit 193, it is judged whether or not the current rotation angle FGadr has the same value as that of the variable FG1 in the memory 21 (step S302).

As a result of the judgment in the step S302, if it is judged that the current rotation angle FGadr does not have the same value as that of the variable FG1 in the memory 21 (the step S302: No), the operational flow returns to the step S301 again to rotate the optical disc 100 until the rotation angle FGadr of the optical disc 100 has the same value as that of the variable FG1 in the memory 21.

On the other hand, as a result of the judgment in the step S302, if the current rotation angle FGadr of the optical disc 100 has the same value as that of the variable FG1 in the memory 21 (the step S302: Yes), then it is judged whether or not the tracking error signal TE is greater than or equal to the upper limit threshold value TEth(max) or is less than or equal to the lower limit threshold value TEth(min) by the operation of the first judgment circuit 191 (step S303). That is, it is judged whether or not the tracking error signal TE, which is detected when the rotation angle FGadr of the optical disc 100 has the same value as that of the variable FG1 in the memory 21, deteriorates.

As a result of the judgment in the step S303, if it is judged that the tracking error signal TE is greater than or equal to the upper limit threshold value TEth(max) or is less than or equal to the lower limit threshold value TEth(min) (the step S303: Yes), the operation of holding the tracking servo is performed by the operation of the hold circuit 194 while the tracking error signal TE is greater than or equal to the upper limit threshold value TEth(max) or is less than or equal to the lower limit threshold value TEth(min) and while the rotation angle FGadr of the optical disc 100 has the same value as that of the variable FG1 in the memory 21 (step S304). Then, if the tracking error signal TE becomes less than the upper limit threshold value TEth(max) or becomes greater than the lower limit threshold value TEth(min), or if the rotation angle FGadr of the optical disc 100 no longer has the same value as that of the variable FG1 in the memory 21, the operation of holding the tracking servo is stopped by the operation of the stop circuit 195 to operate the normal tracking servo.

Here, with reference to FIG. 9, the operation of holding the tracking servo will be explained. FIG. 9 is a timing chart conceptually showing, along a time axis, each of the tracking error signal TE and a tracking servo control signal used in the information recording/reproducing apparatus 1 in the embodiment, in the "operation of holding the tracking servo in the position at which the deterioration of the tracking error signal is generated by the air bubble 140".

As shown in an upper graph of FIG. 9, it is assumed that the tracking error signal TE deteriorates due to the air bubble 140. At this time, if the tracking error signal TE is greater than or equal to the threshold value TE (i.e. a portion shown in a thick line of the upper graph of FIG. 9), the operation of holding the tracking servo is performed.

The operation of holding the tracking servo in the embodiment means the operation which performs the tracking control regarding the tracking error signal TE as "0" regardless the actual numeral value of the tracking error signal TE. This hold operation is performed when the tracking error signal TE deteriorates even though the laser light LB is actually irradiated near the center of the recording track. Therefore, by performing the hold operation when the tracking error signal TE deteriorates due to the air bubble 140 described above, it is possible to prevent such a disadvantage that the tracking control is performed on the basis of, so to speak, the incorrect tracking error signal TE.

However, before the hold operation is performed, the tracking control is performed for a certain period of time on the basis of the incorrect tracking error signal TE (i.e. the portion shown in a dashed line of the upper graph of FIG. 9). Therefore, it is necessary to displace the optical disc 12 in an opposite direction, by the distance that the optical pickup 12 is displaced by this tracking control. In other words, it is necessary to return the optical pickup 12 displaced on the basis of the incorrect tracking error signal TE, to a position at which the laser light can be irradiated near the center of the recording track (in other words, an initial position). In this case, as shown in a lower graph of FIG. 9, a tracking servo control signal, which can cancel a tracking amount of the optical pickup 12 by the tracking servo control signal until the hold operation is performed, is supplied to the optical pickup 12 by the driver 13 controlled by the hold circuit 194 after the hold operation.

In FIG. 8 again, as a result of the judgment in the step S303, if it is judged that the tracking error signal TE is not greater than nor equal to the upper limit threshold value TEth(max) and is not less than nor equal to the lower limit threshold value TEth(min) (the step S303: No), then the counter cnt2 is incremented by "1" by the operation of the counter circuit 20 (step S305).

After that, it is judged whether or not the counter cnt2 is greater than or equal to 2 by the operation of e.g. the stop circuit 195 (step S306).

As a result of the judgment in the step S306, if it is judged that the counter cnt2 is not greater than nor equal to 2 (the step S306: No), the operational flow returns to the step S302 again to continue the processes after the step S302.

On the other hand, as a result of the judgment in the step S306, if it is judged that the counter cnt2 is greater than or equal to 2 (the step S306: Yes), the tracking error signal TE does not deteriorate when the rotation angle FGadr of the optical disc 100 has the same value as that of the variable FG1 in the memory 21 two times or more in a row. More specifically, the tracking error signal TE does not deteriorate in a recording area on a first track, at which the rotation angle has the same value as that of the variable FG1 in the memory 21, and the tracking error signal TE does not deteriorate in a recording area on a second track adjacent to the first recording track, at which the rotation angle has the same value as that of the variable FG1 in the memory 21. That is, it can be considered that the air bubble 140 cannot be recognized in a time of two rotations or more in a row. By this, it can be considered that the air bubble 140 is already not present in the position at which the rotation angle FGadr has the same value as that of the variable FG1 in the memory 21. Thus, the operation of holding the tracking servo is ended to return to the step S102 or the step S104 in FIG. 3 and continue the processes.

Incidentally, with reference to FIG. 10, a more detailed description will be given on an aspect of a change in various signals used in the information recording/reproducing apparatus 1 which performs the operation of holding the tracking servo of the tracking error signal TE at the deterioration position of the tracking error signal TE by the air bubble 140. FIG. 10 is a timing chart conceptually showing, along a time axis, various control signals used in the information recording/reproducing apparatus 1 in the embodiment, in the "operation of holding tracking servo in the position at which the deterioration of the tracking error signal TE is generated by the air bubble 140".

FIG. 10 shows, in the top part, the tracking error signal TE, the upper limit threshold value TEth(max), and the lower limit threshold value TEth(min). If the tracking error signal TE is greater than or equal to the upper limit threshold value TEth(max) or is less than the lower limit threshold value TEth(min), and if the rotation angle FGadr of the optical disc 100 has the same value as that of the variable FG1 in the memory 21 (about 50 degrees in FIG. 10), a hold signal reaches a high level in which the operation of holding the tracking servo is performed.

For example, in timing of A at which the rotation angle FGadr of the optical disc 100 is 40 to 50 degrees, the tracking error signal TE is greater than or equal to the upper limit threshold value TEth(max) or is less than the lower limit threshold value TEth(min). Thus, the hold signal reaches the high level at the timing of A, in which the operation of holding the tracking servo is performed.

Incidentally, while the optical disc 100 rotates one time, the hold operation is preferably performed only once. That is, when the rotation angle FGadr is 40 to 50 degrees while the optical disc 100 rotates one time, the hold operation is preferably performed only once. However, the hold operation may be performed a plurality of times while the optical disc 100 rotates one time. For example, if there are two or more air bubbles in different positions of rotation angles on the same recording track or in similar cases, the hold operation may be performed a plurality of times while the optical disc 100 rotates one time.

Moreover, the hold operation may be performed even in the timing that the rotation angle FGadr of the optical disc 100 is substantially 30 to 40 degrees and in the timing that the rotation angle FGadr is substantially 50 to 60 degrees, in addition to the timing that the rotation angle FGadr of the optical disc 100 is substantially 40 to 50 degrees. In other words, the hold operation may be performed even in the timing that the rotation angle FGadr of the optical disc 100 approximates or come close to the value of the variable FG1 in the memory 21, in addition to the timing that the rotation angle FGadr of the optical disc 100 has the same value as that of the variable FG1 in the memory 21.

Then, in timing of B at which the rotation angle FGadr is 40 to 50 degrees again after the optical disc 100 rotates one time, the tracking error signal TE is greater than or equal to the upper limit threshold value TEth(max) or is less than the lower limit threshold value TEth(min). Thus, the hold signal reaches the high level at the timing of B, in which the operation of holding the tracking servo is performed.

Then, in timing of C at which the rotation angle FGadr is 40 to 50 degrees again after the optical disc 100 rotates one time, the tracking error signal TE is greater than or equal to the upper limit threshold value TEth(max) or is less than the lower limit threshold value TEth(min). Thus, the hold signal reaches the high level at the timing of C, in which the operation of holding the tracking servo is performed.

Then, in timing of D at which the rotation angle FGadr is 40 to 50 degrees again after the optical disc 100 rotates one time, the tracking error signal TE is not greater than nor equal to the upper limit threshold value TEth(max) and is not less than the lower limit threshold value TEth(min). Thus, the hold signal remains the low level at the timing of D, in which the operation of holding the tracking servo is not performed. Moreover, the counter cnt2 is incremented by "1", and the counter cnt2 becomes "1".

Then, in timing of E at which the rotation angle FGadr is 40 to 50 degrees again after the optical disc 100 rotates one time, the tracking error signal TE is not greater than nor equal to the upper limit threshold value TEth(max) and is not less than the lower limit threshold value TEth(min). Thus, the hold signal remains the low level at the timing of E, in which the operation of holding the tracking servo is not performed. Moreover, the counter cnt2 is incremented by "1", and the counter cnt2 becomes "2".

Here, since the counter cnt2 is greater than or equal to "2", the hold operation is stopped to start the normal tracking control at this time point. Moreover, the operation of detecting the deterioration of the tracking error signal TE by the air bubble is started again.

As explained above, according to the information recording/reproducing apparatus 1 in the embodiment, it is possible to preferably identify the cause of the deterioration of the tracking error signal TE. More specifically, if the defect detection signal is at the high level, it can be identified that the deterioration of the tracking error signal TE is caused by the defect. If the defect detection signal is at the low level and the PE signal is less than or equal to a certain value, it can be identified that the deterioration of the tracking error signal TE is caused by the disturbance. Moreover, by the aforementioned detection operation, it can be identified that the deterioration of the tracking error signal TE is caused by the air bubble.

Moreover, because the cause of the deterioration of the tracking error signal TE can be preferably identified, it is possible to perform the preferable tracking control according to the cause. More specifically, if it is identified that the deterioration of the tracking error signal TE is caused by the defect, the operation of holding the tracking servo is performed. If it is identified that the deterioration of the tracking error signal TE is caused by the disturbance, the normal tracking control (in other words, the tracking servo without the hold operation) is performed. Moreover, if it is identified that the deterioration of the tracking error signal TE is caused by the air bubble, the operation of holding the tracking servo is performed. Therefore, regardless of the cause of the deterioration of the tracking error signal TE, it is possible to perform the preferable tracking control. As a result, it is possible to irradiate the desired recording track with the laser light, to thereby inhibit or prevent such a disadvantage that the recording track adjacent to the desired recording track is tracked.

In addition, by updating a program, such as firmware, that operates on the microcomputer 19, the information recording/reproducing apparatus 1 in the embodiment can be realized. In other words, the information recording/reproducing apparatus 1 in the embodiment can be realized without newly adding a physical constituent element, such as a physical circuit and a sensor, like various IC chips. Therefore, it is unnecessary to significantly change the circuit structure of the information recording/reproducing apparatus 1, so that it is possible to reduce a cost necessary to adopt the information recording/reproducing apparatus 1 in the embodiment.

Incidentally, in the aforementioned explanation, after one air bubble 140 is detected, the operation of holding the tracking servo is performed in response to the air bubble 140. However, even if one air bubble 140 is detected, the presence of another air bubble 140 may be detected while the operation of holding the tracking servo is performed in response to the air bubble 140. That is, a plurality of hold operations and a plurality of detection operations may be performed simultaneously and exclusively. In particular, if there are two or more air bubbles 140 in each cycle of the recording track of the optical disc 100, it is considered that the plurality of hold operations and the plurality of detection operations are frequently performed simultaneously and exclusively. In this case, it is preferable to prepare a plurality of variables, FG1, FG2, . . . , FGx (wherein x is 2 or more) which indicate the positions of the air bubbles 140 (specifically, the rotation angles of the optical disc 100 in the positions of the air bubbles 140). Then, with respect to the variables of FG1, FG2, . . . , FGx, the aforementioned detection operations are performed exclusively (in other words, without considering another variable) and the aforementioned hold operations are performed exclusively (in other words, without considering another variable). By this, even if there are two or more air bubbles 140 in each cycle of the recording track of the optical disc 100, the aforementioned various benefits can be received preferably.

However, from the viewpoint of maintaining the stable tracking operation or recording operation, it is preferable to set an upper limit for the number of x.

Moreover, in the aforementioned embodiment, the operation of holding the tracking servo is performed in the position at which the tracking error signal TE deteriorates due to the air bubble, however, instead of performing the hold operation, the gain of the tracking servo may be adjusted (specifically, for example, the gain is reduced).

Moreover, in setting the threshold value TEth, the threshold value TEth may be set in the following method, instead of the aforementioned method, considering that the air bubble 140 may have an effect on the remaining component of the tracking error signal TE. Now, with reference to FIG. 11, another method of setting the threshold value TEth will be explained. FIG. 11 is a graph conceptually showing another threshold value of the tracking error signal.

As shown in FIG. 11, the remaining component of the tracking error signal TE (preferably, the remaining component of the tracking error signal TE obtained by rotating the optical disc 100 one time) is divided into a plurality of sections (sections #1 to #8) along the time axis. Then, the maximum value and the minimum value in each section are extracted.

In this method, the upper limit threshold value TEth(max) is set to an average value of the third largest maximum value TEn(max3) of the maximum values in the respective sections and the maximum value TE(max) of the tracking error signal TE. That is, TEth(max)=(TE(max)+TEn(max3))/2.

Moreover, the lower limit threshold value TEth(min) is set to an average value of the third smallest minimum value TEn(min3) of the minimum values in the respective sections and the minimum value TE(min) of the tracking error signal TE. That is, TEth(min)=(TE(min)+TEn(min3))/2.

This is because the possibility cannot be denied that the largest maximum value TEn(max1) and the second largest maximum value TEn(max2) of the maximum values in the respective sections are caused by the air bubble 140. Similarly, the possibility cannot be also denied that the smallest minimum value TEn(min1) and the second smallest minimum value TEn(min2) of the minimum values in the respective sections are caused by the air bubble 140. Therefore, in order not to have an influence of the air bubble 140 in setting the threshold value TEth, it is preferable to set the threshold value TEth using the third largest maximum value TEn(max3) of the maximum values in the respective sections and the third smallest minimum value TEn(min3) of the minimum values in the respective sections.

Of course, the threshold value TEth may be set using the X-th largest maximum value TEn(maxX) of the maximum values in the respective sections (wherein X is an integer of 2 or more) and the Y-th smallest minimum value TEn(minY) of the minimum values in the respective sections (wherein Y is an integer of 2 or more).

Moreover, in the aforementioned embodiment, an explanation is given on the optical disc 100 as one example of the information recording medium and the recorder or player related to the optical disc as one example of the information recording/reproducing apparatus; however, the present invention is not limited to the optical disc and the recorder or player for the optical disc, and it can be also applied to other various information recording media which support high-density recording or high transmission rate, and recorders or players for the various information recording media.

The present invention is not limited to the aforementioned embodiment, but various changes may be made, if desired, without departing from the essence or spirit of the invention which can be read from the claims and the entire specification. An information recording apparatus and method, and a computer program for recording control, all of which involve such changes, are also intended to be within the technical scope of the present invention.

INDUSTRIAL APPLICABILITY

The information recording apparatus and method, and the computer program according to the present invention can be applied to an information recording apparatus, such as a DVD recorder. Moreover, they can be applied to an information recording apparatus or the like which is mounted on various computer equipment for consumer use or for commercial use, or which can be connected to various computer equipment.

The invention claimed is:

1. An information recording apparatus comprising:
a first judging device for judging whether or not an absolute value of a tracking error signal is greater than or equal to a predetermined first threshold value;
a detecting device for detecting, as a detection angle, a rotation angle of an information recording medium when it is judged that the absolute value of the tracking error signal is greater than or equal to the first threshold value;
a second judging device for judging whether or not the judgment that the absolute value of the tracking error signal is greater than or equal to the first threshold value is performed in synchronization with rotation of the information recording medium and at the same detection angle in a row;
a holding device for holding tracking servo near the detection angle if it is judged by said second judging device that the judgment that the absolute value of the tracking error signal is greater than or equal to the first threshold value is performed in synchronization with the rotation of the information recording medium and at the same detection angle in a row; and
a stopping device for stopping the hold of the tracking servo if it is judged by said second judging device that the judgment that the absolute value of the tracking error signal is not greater than nor equal to the first threshold value is performed in synchronization with the rotation of the information recording medium and at the same detection angle in a row, wherein
each of the judgment by said first judging device, the detection by said detecting device, and the judgment by said second judging device being performed in parallel with information recording onto the information recording medium.

2. The information recording apparatus according to claim 1, wherein
the information recording medium comprises a spiral or concentric recording track, and
said second judging device judges whether or not the judgment that the absolute value of the tracking error signal is greater than or equal to the first threshold value is performed at the detection angle on the recording track adjacent to the recording track in which it is judged that the absolute value of the tracking error signal is greater than or equal to the first threshold value.

3. The information recording apparatus according to claim 1, further comprising:
a first incrementing device for incrementing a first count value;
a first controlling device for controlling said first incrementing device to increment the first count value if it is judged the absolute value of the tracking error signal is greater than or equal to the first threshold value, at the detection angle; and a first setting device for setting the first count value to an initial value if it is judged that the absolute value of the tracking error signal is not greater than nor equal to the first threshold value, at the detection angle, said second judging device judging whether or not the first count value is greater than or equal to a predetermined second threshold value.

4. The information recording apparatus according to claim 3, wherein the information recording medium comprises a spiral or concentric recording track, and said first controlling device controls said first incrementing device to increment the first count value if it is judged the absolute value of the tracking error signal is greater than or equal to the first threshold value at the detection angle on the recording track adjacent to the recording track in which it is judged that the absolute value of the tracking error signal is greater than or equal to the first threshold value.

5. The information recording apparatus according to claim 1, wherein said first judging device judges whether or not the absolute value of the tracking error signal is greater than or equal to the first threshold value if a defect detection signal is at a low level, the defect detection signal indicating presence or absence of a defect on the information recording medium.

6. The information recording apparatus according to claim 1, wherein the first threshold value is at least one of an average value between a maximum value that can be taken by the tracking error signal and a maximum value of a remaining component of the tracking error signal, and an average value between a minimum value that can be taken by the tracking error signal and a minimum value of the remaining component of the tracking error signal.

7. The information recording apparatus according to claim 1, wherein the first threshold value is at least one of an average value between an at least second or more largest maximum value of maximum values in a plurality of sampling sections when the tracking error signal is divided by a plurality of sampling sections and an at least second or more largest maximum value of maximum values in a plurality of sampling sections when a remaining component of the tracking error signal is divided by a plurality of sampling sections, and an average value between an at least second or more smallest minimum value of minimum values in a plurality of sampling sections and an at least second or more smallest minimum value of minimum values in a plurality of sampling sections.

8. The information recording apparatus according to claim 1, wherein the holding device holds the tracking servo if it is judged that the absolute value of the tracking error signal is greater than or equal to the first threshold value, near the detection angle.

9. The information recording apparatus according to claim 1, wherein the holding device holds the tracking servo once while the information recording medium rotates one time.

10. The information recording apparatus according to claim 1, further comprising:

a second incrementing device for incrementing a second count value;

a second controlling device for controlling said second incrementing device to increment the second count value if it is judged the absolute value of the tracking error signal is not greater than nor equal to the first threshold value, near the detection angle; and a second setting device for setting the second count value to an initial value if it is judged that the absolute value of the tracking error signal is greater than or equal to the first threshold value, near the detection angle, said stopping device stopping the hold of the tracking servo if the second count value is greater than or equal to a predetermined third threshold value.

11. An information recording method comprising:

a first judging process of judging whether or not an absolute value of a tracking error signal is greater than or equal to a predetermined first threshold value;

a detecting process of detecting, as a detection angle, a rotation angle of an information recording medium when it is judged that the absolute value of the tracking error signal is greater than or equal to the first threshold value;

a second judging process of judging whether or not the judgment that the absolute value of the tracking error signal is greater than or equal to the first threshold value is performed in synchronization with rotation of the information recording medium and at the same detection angle in a row;

a holding process of holding tracking servo near the detection angle if it is judged by said second judging process that the judgment that the absolute value of the tracking error signal is greater than or equal to the first threshold value is performed in synchronization with the rotation of the information recording medium and at the same detection angle in a row; and a stopping process of stopping the hold of the tracking servo if it is judged by said second judging process that the judgment that the absolute value of the tracking error signal is not greater than nor equal to the first threshold value is performed in synchronization with the rotation of the information recording medium and at the same detection angle in a row, wherein each of the judgment by said first judging process, the detection by said detecting process, and the judgment by said second judging process being performed in parallel with information recording onto the information recording medium.

12. A non-transitory computer-readable recording medium recording thereon a computer program for tangibly embodying a program of instructions executable by a computer provided in an information recording apparatus comprising:

a first judging device for judging whether or not an absolute value of a tracking error signal is greater than or equal to a predetermined first threshold value;

a detecting device for detecting, as a detection angle, a rotation angle of an information recording medium when it is judged that the absolute value of the tracking error signal is greater than or equal to the first threshold value;

a second judging device for judging whether or not the judgment that the absolute value of the tracking error signal is greater than or equal to the first threshold value is performed in synchronization with rotation of the information recording medium and at the same detection angle in a row;

a holding device for holding tracking servo near the detection angle if it is judged by said second judging device that the judgment that the absolute value of the tracking error signal is greater than or equal to the first threshold value is performed in synchronization with the rotation of the information recording medium and at the same detection angle in a row;

and a stopping device for stopping the hold of the tracking servo if it is judged by said second judging device that the judgment that the absolute value of the tracking error signal is not greater than nor equal to the first threshold value is performed in synchronization with the rotation of the information recording medium and at the same detection angle in a row, wherein each of the judgment by said first judging device, the detection by said detecting device, and the judgment by said second judging device being performed in parallel with information recording onto the information recording medium, said computer program making the computer function as at least one portion of said first judging device, said detecting device, said second judging device, said holding device and said stopping device.

13. The information recording apparatus according to claim 1, wherein an absolute value of the first threshold value is less than each absolute value of a maximum value and a minimum value that can be taken by the tracking error signal.

* * * * *